United States Patent
Guillama et al.

(10) Patent No.: US 10,977,709 B2
(45) Date of Patent: Apr. 13, 2021

(54) DECISION ORGANIZER

(71) Applicant: The Quantum Group Inc., Lake Worth, FL (US)

(72) Inventors: Noel Guillama, Wellington, FL (US); Chester Heath, Boca Raton, FL (US)

(73) Assignees: The Quantum Group, Inc., Lake Worth, FL (US); Noel J. Guillama, Wellington, FL (US)

( * ) Notice: Subject to any disclaimer, the term of this patent is extended or adjusted under 35 U.S.C. 154(b) by 331 days.

(21) Appl. No.: 15/826,304

(22) Filed: Nov. 29, 2017

(65) Prior Publication Data
US 2018/0150895 A1 May 31, 2018

Related U.S. Application Data

(60) Provisional application No. 62/427,500, filed on Nov. 29, 2016, provisional application No. 62/574,523, filed on Oct. 19, 2017.

(51) Int. Cl.
*G06Q 30/00* (2012.01)
*G06Q 30/06* (2012.01)
*G06F 3/0481* (2013.01)

(52) U.S. Cl.
CPC ..... *G06Q 30/0629* (2013.01); *G06F 3/04817* (2013.01); *G06Q 30/0633* (2013.01); *G06Q 30/0643* (2013.01)

(58) Field of Classification Search
CPC ............... G06Q 30/00; G06Q 30/0601; G06Q 30/0607; G06Q 30/0633; G06Q 30/0641
See application file for complete search history.

(56) References Cited

U.S. PATENT DOCUMENTS

| | | | | |
|---|---|---|---|---|
| 5,832,212 A | * | 11/1998 | Cragun | G06F 21/6218 726/2 |
| 5,960,411 A | * | 9/1999 | Hartman | G06Q 20/04 705/26.81 |
| 6,336,099 B1 | * | 1/2002 | Barnett | G06Q 20/108 705/14.35 |
| 8,359,642 B1 | * | 1/2013 | Wurtenberger | H04N 21/23418 726/7 |

(Continued)

OTHER PUBLICATIONS

Parimelalagan, Priya. An architecture for integrating multi-vendor catalogs in electronic commerce. Diss. Concordia University, 2000. (Year: 2000).*

*Primary Examiner* — Christopher B Seibert
(74) *Attorney, Agent, or Firm* — Nixon Peabody LLP

(57) ABSTRACT

Systems and methods of displaying product information relating to multiple purchase options are provided. A method includes displaying, in a first portion of a user interface, a web browser and displaying, in a second portion of the user interface, a decision organizing tool comprising a candidate icon portion comprising a plurality of candidate icons and an active icon portion. The method also includes receiving instructions to transfer of one of the plurality of candidate icons from the candidate icon portion to the active icon portion and, in response to the receiving, transferring the one of the plurality of candidate icons to the active icon portion, where the one of the plurality of candidate icons provides a link to an item currently displayed in the web browser and offered for sale. Effectively becoming a common shopping cart for multiple websites simultaneously.

19 Claims, 23 Drawing Sheets

(56) References Cited

U.S. PATENT DOCUMENTS

| | | | | |
|---|---|---|---|---|
| 2002/0186255 | A1* | 12/2002 | Shafron | G06Q 30/0617 |
| | | | | 715/810 |
| 2004/0117384 | A1* | 6/2004 | Ray | G06Q 20/12 |
| 2005/0125301 | A1* | 6/2005 | Muni | G06Q 20/208 |
| | | | | 705/23 |
| 2007/0256093 | A1* | 11/2007 | Hiler | H04N 21/47 |
| | | | | 725/28 |
| 2008/0046337 | A1* | 2/2008 | Tarvydas | G06Q 30/0623 |
| | | | | 705/26.81 |
| 2008/0155614 | A1* | 6/2008 | Cooper | G06Q 30/0601 |
| | | | | 725/91 |
| 2009/0240518 | A1* | 9/2009 | Borom | G06Q 30/0633 |
| | | | | 705/14.1 |
| 2010/0011322 | A1* | 1/2010 | Billmaier | G06F 3/0482 |
| | | | | 715/830 |
| 2010/0332337 | A1* | 12/2010 | Bullock | G06Q 20/12 |
| | | | | 705/26.82 |
| 2011/0307280 | A1* | 12/2011 | Mandelbaum | G06Q 10/025 |
| | | | | 705/6 |
| 2012/0006891 | A1* | 1/2012 | Zhou | G06Q 30/0641 |
| | | | | 235/380 |
| 2013/0047115 | A1* | 2/2013 | Migos | G06F 3/0484 |
| | | | | 715/776 |
| 2014/0052549 | A1* | 2/2014 | Dollens | G06Q 30/0623 |
| | | | | 705/14.73 |
| 2014/0250390 | A1* | 9/2014 | Holmes | G06F 3/0482 |
| | | | | 715/760 |
| 2014/0378204 | A1* | 12/2014 | Michel | G07F 17/3244 |
| | | | | 463/17 |
| 2015/0212710 | A1* | 7/2015 | Gupta | G06Q 30/0641 |
| | | | | 705/27.1 |

* cited by examiner

Search Assistant Alert

Based on previous decisions, and other items advertized on the Internet for similar items, your selection may be a sub-optimal choice.
You may wish to consider the following links instead.

Better Price Performance

More Reliability / Endurance

Lower Price

Higher Capacity

Better Energy Efficiency

FIG. 4

Payment Options

- PayPal
- Credit Card
- Debit Card - Bank Transfer
- Line of Credit
- Cash On Delivery
- Apply For Decision Organizer Credit

FIG. 10

- Deal 1 is complete – LINK to invoice   79.99*
- Deal 2 is complete – LINK to invoice  181.97
- Deal 3 is complete – LINK to invoice   19.99*
- Deal 4 is complete – LINK to invoice   89.99
- Deal 5 is complete – LINK to invoice  109.98
- Deal 6 is complete – LINK to invoice  134.99

Total  616.91

Accept this itemized invoice from all vendors? Y/N   Y
Receipt texted to 561-555-1234

*Net After Discounts

1450

DECISION ORGANIZER

CROSS-REFERENCE TO RELATED APPLICATIONS

This application claims priority to and the benefit of U.S. Provisional Patent Application No. 62/427,500, entitled "DECISION ORGANIZER" and filed Nov. 29, 2016, the contents of which are herein incorporated by reference as if fully set forth herein. This application also claims priority to and the benefit of U.S. Provisional Patent Application No. 62/574,523, entitled "MEDICAL DECISION ORGANIZER: SYSTEM FOR THE ARBITRAGE OF MEDICAL RESOURCES, COMMODITIES, AND SERVICES" and filed Oct. 19, 2017, the contents of which are herein incorporated by reference as if fully set forth herein.

FIELD OF THE INVENTION

The present invention relates to system and methods for managing decisions and configurations thereof, and more specifically to apparatus and methods for managing decisions associated with multiple online resources.

BACKGROUND

The selling of goods and services via the Internet and more particularly via the World Wide Web is increasing each year and continues to increase. Consumers find convenience in shopping at their computers and having goods delivered to them at their homes or places of business. As electronic commerce has continued to increase, the number of online companies selling goods and services to consumers has increased exponentially. As a result, even for a simple list of items, a consumer may need to spend a significant amount of time reviewing a large number of available times from multiple sources. Moreover, for such a simple list, a consumer may have to engage in multiple transactions to obtain the items. Additionally, variations on items may result in different variations required in the other items acquired. Accordingly, some types of online shopping decisions have become considerably more complex and time-consuming.

Thus, there is a need for a system that provides consumers a way to manage potential online purchases and expedite the decision process during online shopping.

SUMMARY

Embodiments of the invention concern apparatus and methods for managing decisions associated with multiple online resources. In a first embodiment of the invention, there is provided a method of displaying product information relating to multiple purchase options. The method includes displaying, in a first portion of a user interface, a web browser and displaying, in a second portion of the user interface, a decision organizing tool comprising a candidate icon portion comprising a plurality of candidate icons and an active icon portion. The method also includes receiving instructions to transfer of one of the plurality of candidate icons from the candidate icon portion to the active icon portion and, in response to the receiving, transferring the one of the plurality of candidate icons to the active icon portion, where the one of the plurality of candidate icons provides a link to an item currently displayed in the web browser and offered for sale.

In the method, each of the plurality of candidate icon can be pre-associated an item currently displayed in the web browser and offered for sale.

In the method, the one of the plurality of candidate icons is configured to provide a graphical representation of the item displayed in the web browser and offered for sale.

The method can further include associating the one of the plurality of icons with a set of icons in the active icon portion and, in response to the receiving and transferring, moving another one of the plurality of candidate icons to the active icon portion, where the other one of the plurality of candidate icons provides a link to another item equivalent to an item currently displayed in the web browser and offered for sale.

The method can further include displaying, in the second portion of the user interface, an indicia of the relationship of a web site currently presented in the web browser to any icons in the active icon area.

The method of claim 1 can further include detecting additional information associated with the item currently displayed in the web browser and offered for sale and, in response to the detecting, generating a notification in the user interface with the additional information. The notification can include a prompt for the user.

In other embodiments of the invention, there are provided systems for implementing the methods of the first embodiment and computer-readable medium having a computer program stored thereon for causing a computer to implement the methods of the first embodiment.

BRIEF DESCRIPTION OF THE DRAWINGS

FIG. 4 shows an exemplary search assistant user interface that aides in the selection of alternatives according to the various embodiments.

FIG. 10 shows and exemplary payment options user interface according to the various embodiments.

FIG. 11 shows an exemplary UI according to the various embodiments.

DETAILED DESCRIPTION

Figure 1:
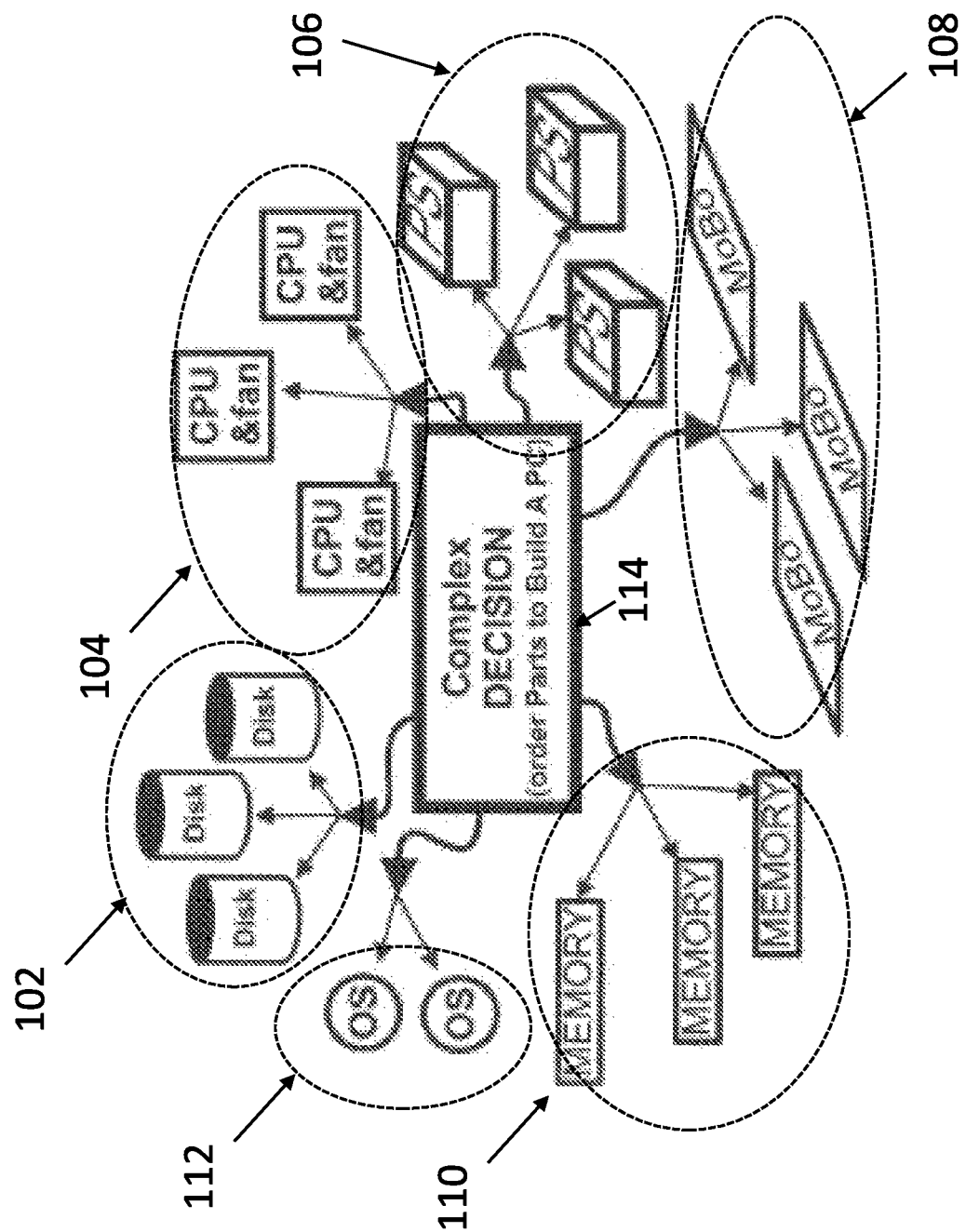
FIG. 1 schematically illustrates decisions required for purchase components for a computer that is useful for describing the various embodiments.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As noted above, there are various challenges with making purchases in an online environment. An online purchase of one item is relatively straightforward. In such purchases, the user may go to an online retailer's web site and directly purchase the item. In some cases, a user may visit a couple competitor websites to identify which retailer is offering the item at the lowest price. However, some types of purchase decisions are not as straightforward. For example, sometimes the purchase decision involves the purchase of multiple related items. Further, as noted above, a purchase decision on one item may affect purchase decisions on other items. Additionally, certain purchases may result in certain trade-offs to consider. Accordingly, selecting a set of items and track of potential sets of items can be difficult in the online environment, as online stores provide no means to track potential purchases. Moreover, in the event that purchases have to made across different online stores, there is no means for efficiently tracking a set of related purchases in the online environment. Additionally, there is no present means for facilitating the purchase process so that a set of related purchases from different online retailers can be handled in a single purchase event.

In view of the limitations of existing online purchasing system, the various embodiments are directed to systems and methods for facilitating online discovery and purchases of one or more set of related items. In particular, the various embodiments provide a decision organizer tool (DOT) that operates at a user terminal in conjunction with a web browser or any other portal accessing a retailer's online store. In operation, the DOT allows a user to select items from the web browser and keep track of said items in the tool. The DOT is configured so as to allow the user to add or remove items at will for a set. Further, the DOT is configured to allow the user to concurrently keep track of items for multiple lists. In some embodiments, the DOT is also configured to monitor online retailers for changes in prices, compatibility, and other properties that can affect the decision process for the consumer. Moreover, the tool can also be configured to automatically identify alternatives and suggest substitutions to the user. Finally, the tool can be configured to "negotiate" a purchase. That is, the DOT can not only provide a single point of purchase for the consumer, but can also automatically access multiple retailer sites to verify a best purchase option for the user. These and other features of the DOT described above will be discussed in greater detail below.

For ease of illustration, the various embodiments will be described with respect to the purchase of components for assembling a computer. However, the various embodiments are not limited in this regard. Rather the various embodiments can also be used to allow a user to procure any other types of items, services, or any combination thereof. For example, in certain embodiments, the user can utilize a DOT in accordance with the various embodiments to procure medical goods and services.

In general, the process of assembling a computer involves various decisions. This is graphically illustrated in FIG. 1. As shown in FIG. 1, the process of purchasing computer components involves selection of various parts and options. For example, the process can involve selection of storage devices 102, central processing units and fans 104, power supplies 106, motherboards 108, memory 110, and operating system 112. Further, various other types of components and accessories can also be involved in the decision 114.

Historically, pen and paper might be used to track items and perform the decision process. However, pen and paper has the limitation of requiring updates at all times to assure that the information listed therein is up to date. Another conventional method has been to use different tabs or windows active, each with a different retailer. However, such method only allows one to keep track on a retailer basis instead of an item set basis. Moreover, as the number of retailers increases and the number of components increases, it becomes more difficult to manage an ever-increasing number of windows and tabs. An alternative to tabs and windows is to use a series of shortcuts and links, but clicking between websites in a single window does not guarantee that purchase selections are maintained. Further, such a configuration still organizes items on a per-retailer basis. Moreover, the with additional operations needed to alternate between retailer web sites, the likelihood of error is significantly increased.

In view of these problems, the various embodiments therefore provide a DOT configured to run concurrently with the web browser or other software retailer portal, as shown in FIGS. 2A-2I. FIGS. 2A-2I schematically illustrate an example graphical user interface (GUI) 200 implementing an exemplary embodiment of the invention. As shown in FIGS. 2A-2I, the GUI 200 can include a portion associated with a web browser 202 and a portion associated with the DOT 204. The arrangement of the web browser 202 and the DOT 204 can vary from device to device. Accordingly, the web browser 202 and the DOT 204 can be arranged according to display rules for any type of device. Further, the DOT 204 can also be configured to activate on demand based on activating a button, icon, or the like located anywhere in the GUI 200. In some configurations, such activation can cause the GUI 200 to be automatically rearranged to permit the DOT 204 to be simultaneously presented. However, in other embodiments, the web browser 202 and the DOT 204 can be allowed to overlap. In certain embodiments, the DOT 204 can be persistently displayed. These arrangements of the web browser 202 and the DOT 204 are discussed solely by way of example and not by way of limitation. Accordingly, any other potential arrangement or configuration for simultaneously or contemporaneously presenting the web browser 202 and the DOT 204 is contemplated in the various embodiments.

Figure 2A:
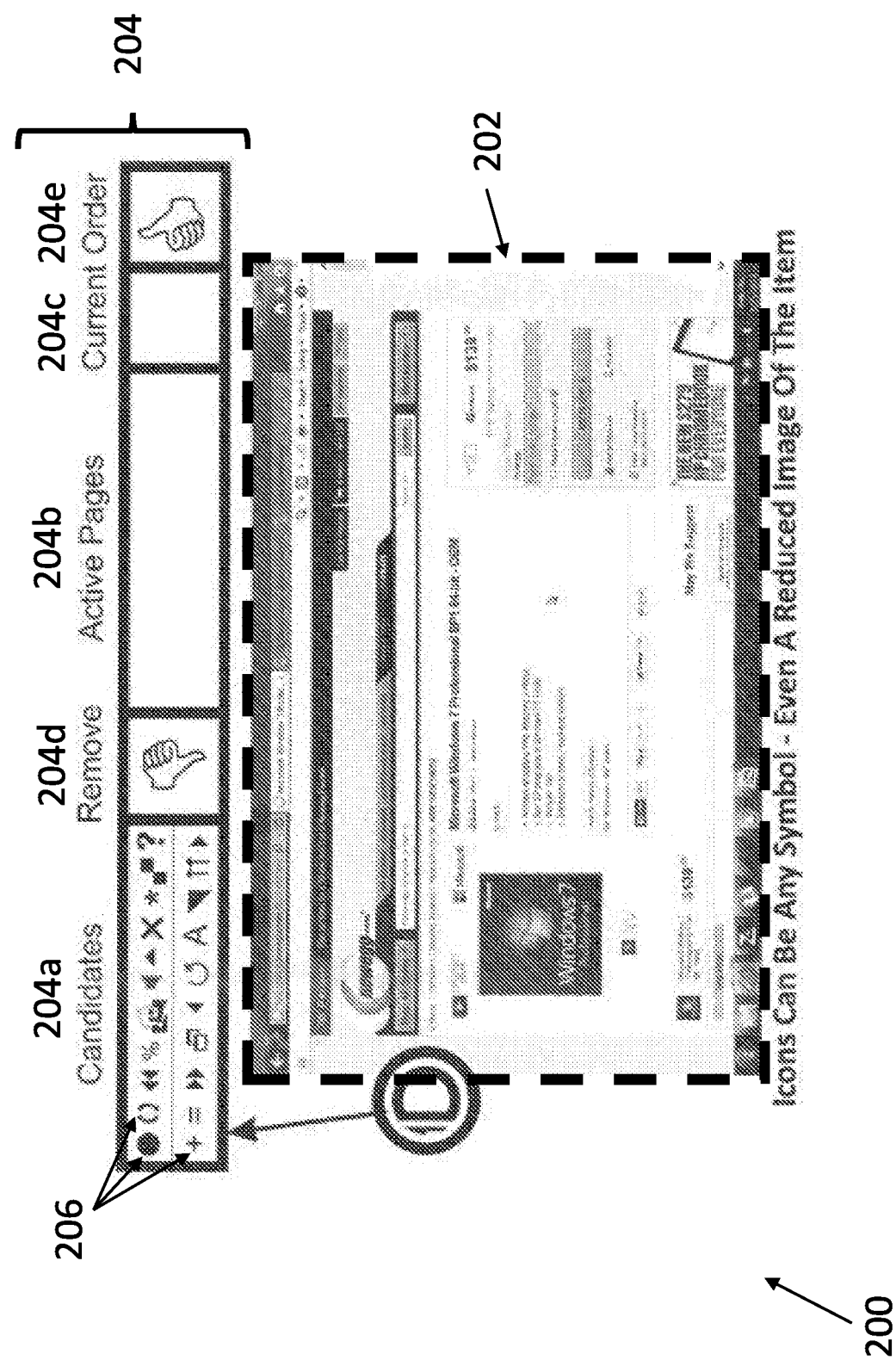
FIGS. 2A-2I show different configurations of a graphical user interface according to the various embodiments.

As shown in FIG. 2A-2I, the DOT 204 consists of various display elements or sections 204a-204e. A first section 204a, as shown in FIG. 2A, shows a series of candidate icons 206 that can represent items to be selected. In some embodiments, the icons can be random icons, which the user can later associated with the item to be purchased from the website. In some cases, this associating can happen automatically, as described in further detail below. In other embodiments, the icons can be generated by the DOT 204 when a website is selected. That is, the web site 202 can be scanned by an engine of the DOT 204 for items available for purchase. Thereafter, corresponding icons can be generated for section 204*a*. In some cases, the icons 206 can represent the items on the website. Such as by using a generic icon for the type of item or by creating an icon from a picture of the item in the web browser. In still other embodiments, the icons may not be graphical. That is, the icons may consist of alphanumeric characters. For example, the icon may show the name of an item for sale.

Additionally, the candidate icons 206 may provide additional information. For example, if a mouse cursor hovers over the icon, a tooltip or other GUI element can be generated that provides additional information regarding the item. Any other method of activating an icon can be used in the various embodiments as well. For example, a right click or other type of alternate selection can be used to display the information or at least provide access to commands that cause the information to be displayed. Such information may be pre-populated by the DOT 204 or can be pulled from the content of the web site currently presented in the web browser.

Figure 2B:
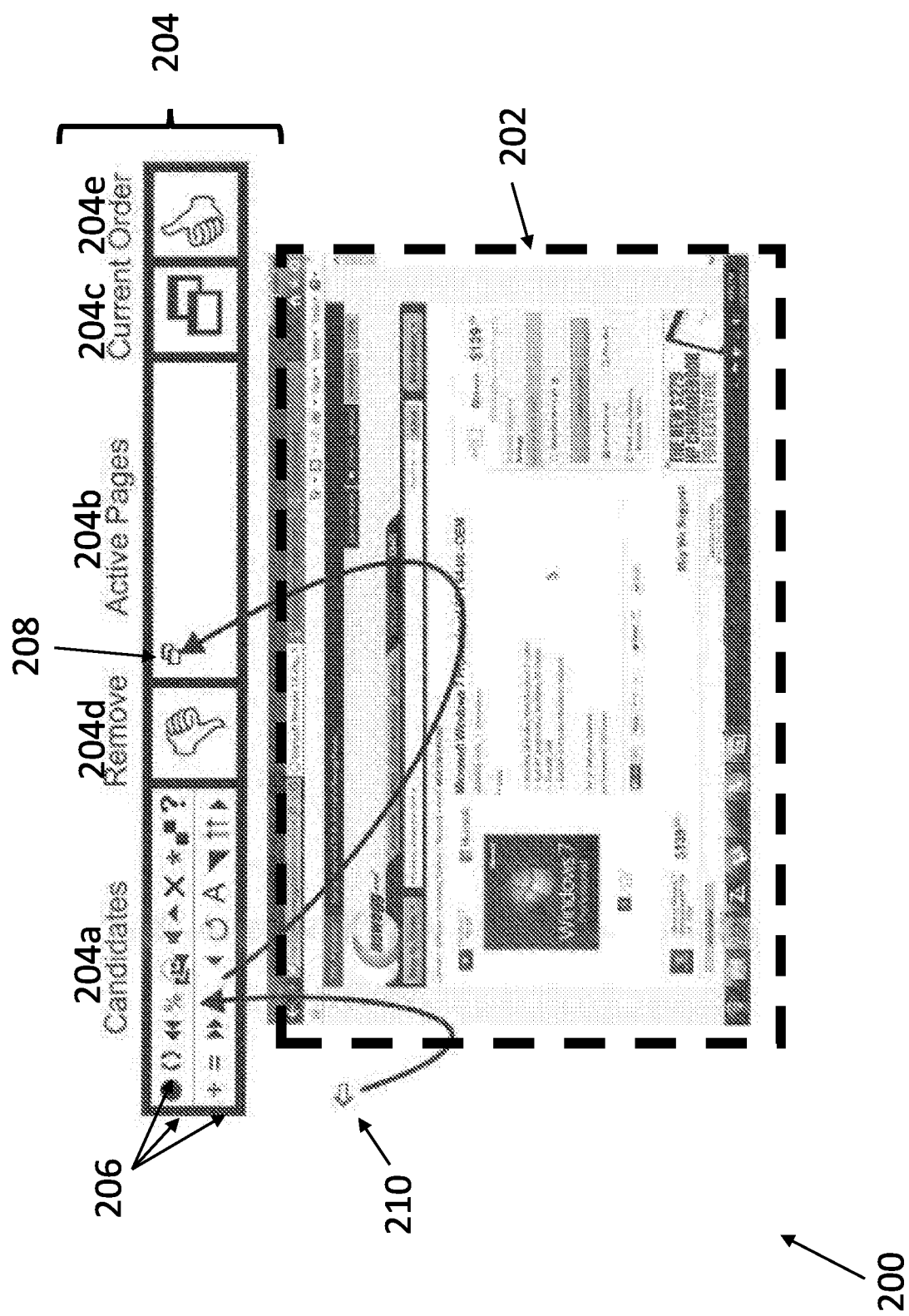

Turning next to FIG. 2B, a second section 204*b* of the DOT 204 can indicate active pages or icons 208. That is, icons representing items selected from the web browser 202 can be used to populate second 204*b*. The active icons 208 can be added to section 204*b* in a variety of ways. For example, in some embodiments, the DOT 204 can monitor activities on the web browser 202. In the event that a user selects an item in the web browser 202, the DOT 204 can be configured to automatically add a corresponding active icon 208 to section 204*b*. In other embodiments, the selections can instead be made from the DOT 204. That is, a user can instead select a candidate icon 206 in section 204*a* corresponding to an item on the web browser 204. The candidate icon 206 can then be dragged over to section 204*b*, where it becomes an active icon 208. Regardless of how the active icon 208 is added for section 204*b*, the active icon 208 is thereafter persistently displayed in section 204*b*. The active icon 208 then serves to provide one-click access to the item it represents. Thus, clicking on the active icon 208 can cause the web page for the item to be presented. Alternatively, the active icon can be activated to display information, similar to that discussed above with respect to candidate icon 206.

In embodiments where the active icon 208 was originally a randomly generated candidate icon 206, a randomly generated replacement candidate icon 210 can be insert in its place. This icon can be the same or different as active icon 208. However, in certain embodiments, a different icon is selected to facilitate distinguishing from other candidate icons 206 and active icons 208. Similarly, in the case a generic icon representing a type of item is selected to the active icon, the DOT 204 can add another generic icon. Again, this icon can be the same or different as active icon 208. However, in certain embodiments, a different icon is selected to facilitate distinguishing from other candidate icons 206 and active icons 208.

As noted above, a set of items to be purchased can vary depending on the number of options available. Accordingly, section 204*b* can be configured to support the building of different sets of items. For example, in FIG. 2B, a first active icon 208 is added for a software package shown web browser 202. If a similar or equivalent version of the software package is selected a second active icon 208' can be added to section 4*b*. In certain embodiments, more than one second active icon can be added. For example, if two or more items are equivalent to the item associated with the first active icon 208, then two second active icons can be added to represent two items to purchase. In some cases, additional indicia can be provided to indicate that the two items are linked in this regard. For example, a line can connect the two icons or a box can surround the two icons. However, the various embodiments are not limited in this regard and any other ways of indicating the relationship of the icons between corresponding items can be provided in the DOT 204.

Figure 2C:
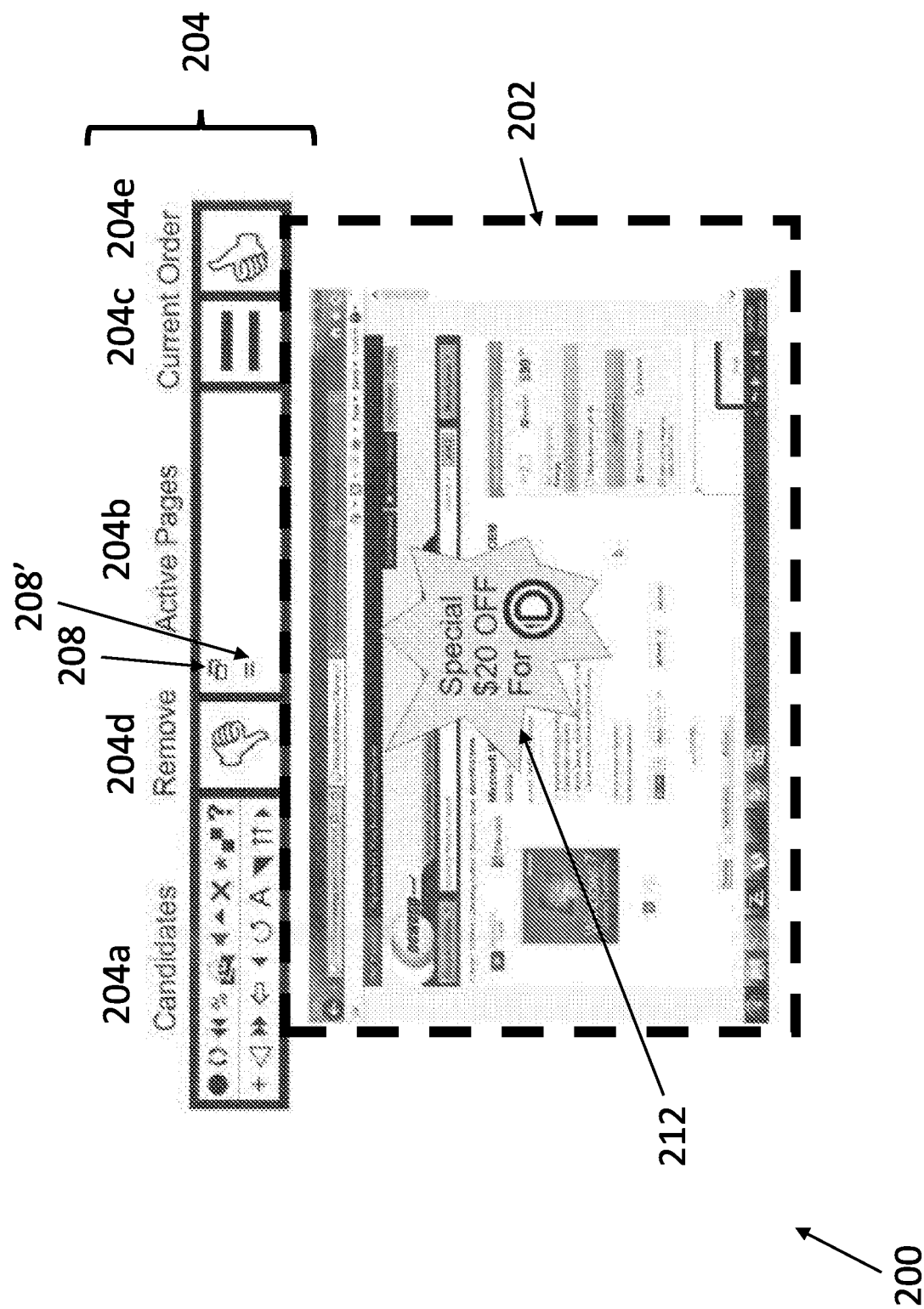

In some embodiments, the relationship between a first active icon 208 and a second active icon 208' can be indicated in the DOT 204. For example, each first active icon 208 representing a different item can be have a different color background. Thus, when the second active icon 208' can be presented with a same In certain embodiments, the selection of a second active icon 208' can occur automatically. In particular, the DOT 204 can be configured to add second active icon 208' if the DOT 204 detects a similar or equivalent item for sale on the same web page or a different web page. In some configurations, the DOT 204 can be configured by the user to search for such similar or equivalent items in the background and notify the user. For example, as shown in FIG. 2C, a notification 212 can be generated indicating the reason for adding second active icon 208' to section 204*b*. Alternatively, second active icon 208' can be added in a temporary fashion to section 204*b*. In such cases, the notification 212 can also include a selection button or control (not shown) to permanently add second active icon 208' to section 204*b*. Although a pop-up type formation for notification 212 is shown in FIG. 2C, this is for ease of illustration only. In the various embodiments, notification 212 can be provided in any form available via the device, including notifications including any visual elements, audio elements, or any combination thereof.

In another configuration, after the second active icon 208' is added to section 204*b*, the user can be required to take additional action to permanently add the second active icon 208'. For example, the user may be required to click or otherwise selection the second active icon 208' and take one or more steps thereafter. In some configurations, the DOT 204*b* can include a timer for the second active icon 208' in its temporary state. Thus, when the timer runs out and the user has not acted to switch the second active icon 208' to a permanent state, the second active icon 208' can be removed. The timer can also be used to control how long notification 212 is displayed. In some configurations where the user can dismiss the notification 212 without making the second active icon 208' permanent, the dismissal can cause the second active icon 208' to be automatically removed.

In some embodiments, the temporary nature of the second active icon 208' can be indicated visually. For example, the second active icon 208' can be presented "greyed out" or with some other type of re-coloring. In another example, a visual indicator can be superimposed over the second active icon 208'. In a particular example, a question mark or other lettering can be superimposed. In still another example, numbers indicating the countdown of the timer can be superimposed as well.

In some embodiments, not all of the candidate icons 206 may be visible at all times. For example, section 204*a* may include a scroll bar or other control feature to allow the user to peruse the available candidate icons 206. In the event, one is removed (by changing it to an active icon 208), the DOT 204 can be configured to rearrange the candidate icons 206 in section 204*a* to remove any spaces between the candidate icons 206. Similarly, as active icons 208 are added to section 204*b*, control features can also be added to section 204*b* to allow the user to peruse the active icons 208.

Once two or more active icons are presented in section 204*b*, as in FIG. 2C, the DOT 204 is also configured to provide an indication of the relationship of the web page currently presented to the active icons. In some embodiments, as shown in FIG. 2C, section 204C can be configured to present such an indication. For example, as shown in FIG. 2C, the DOT 204 can be configured to reproduce the second active icon 208' in second 204*c* when second active icon 208' is selected in section 204*b* or the web page currently presented is that corresponding to the item associated with second active icon 208'. Thereafter, when a user selects active icon 208 or navigates to the associated web page, section 204*c* would change to reflect the new selection. This is also illustrated in FIGS. 2D, 2E, and 2F which show further views of GUI 200 as further selections of items are made.

Figure 2D:
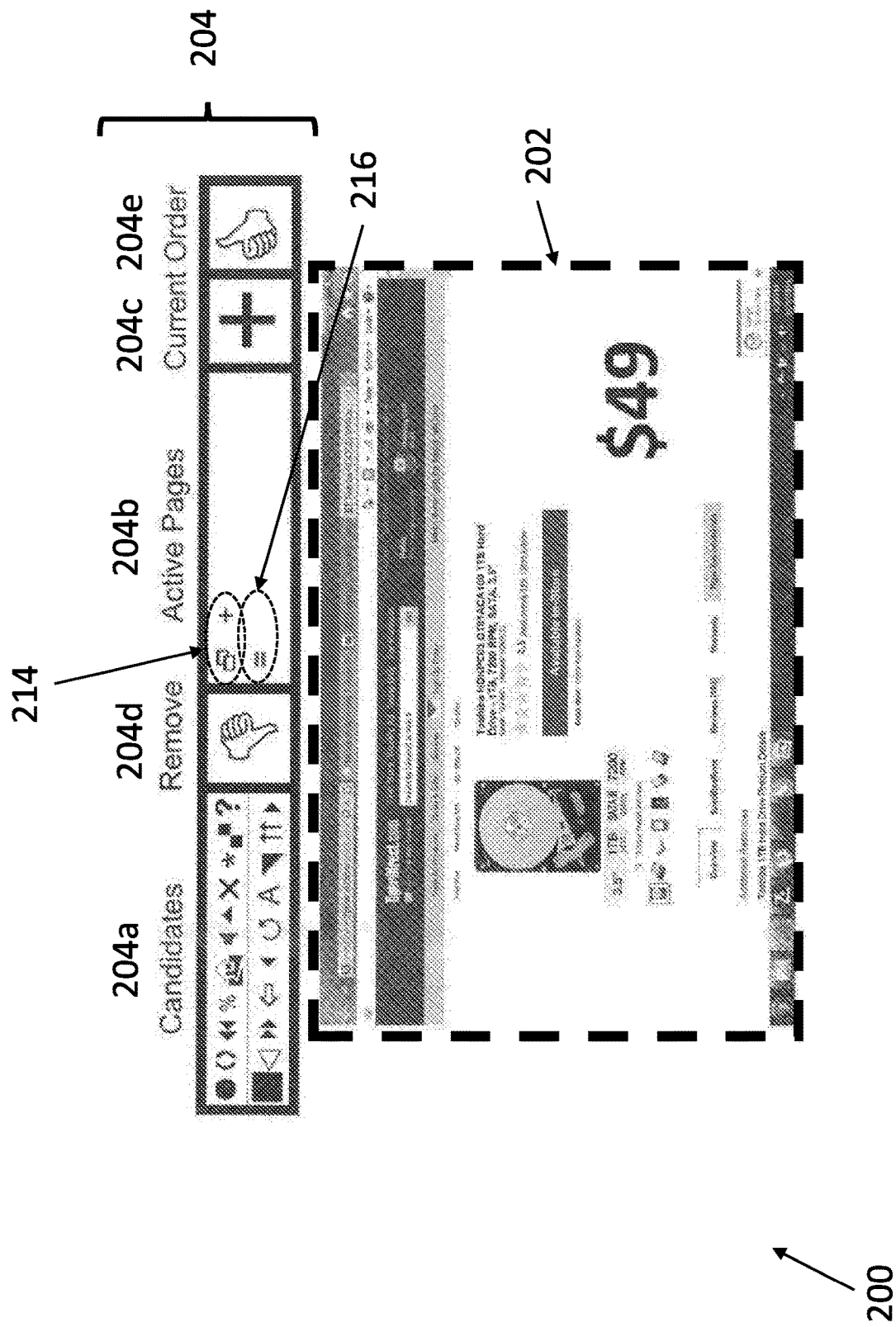
Figure 2E:
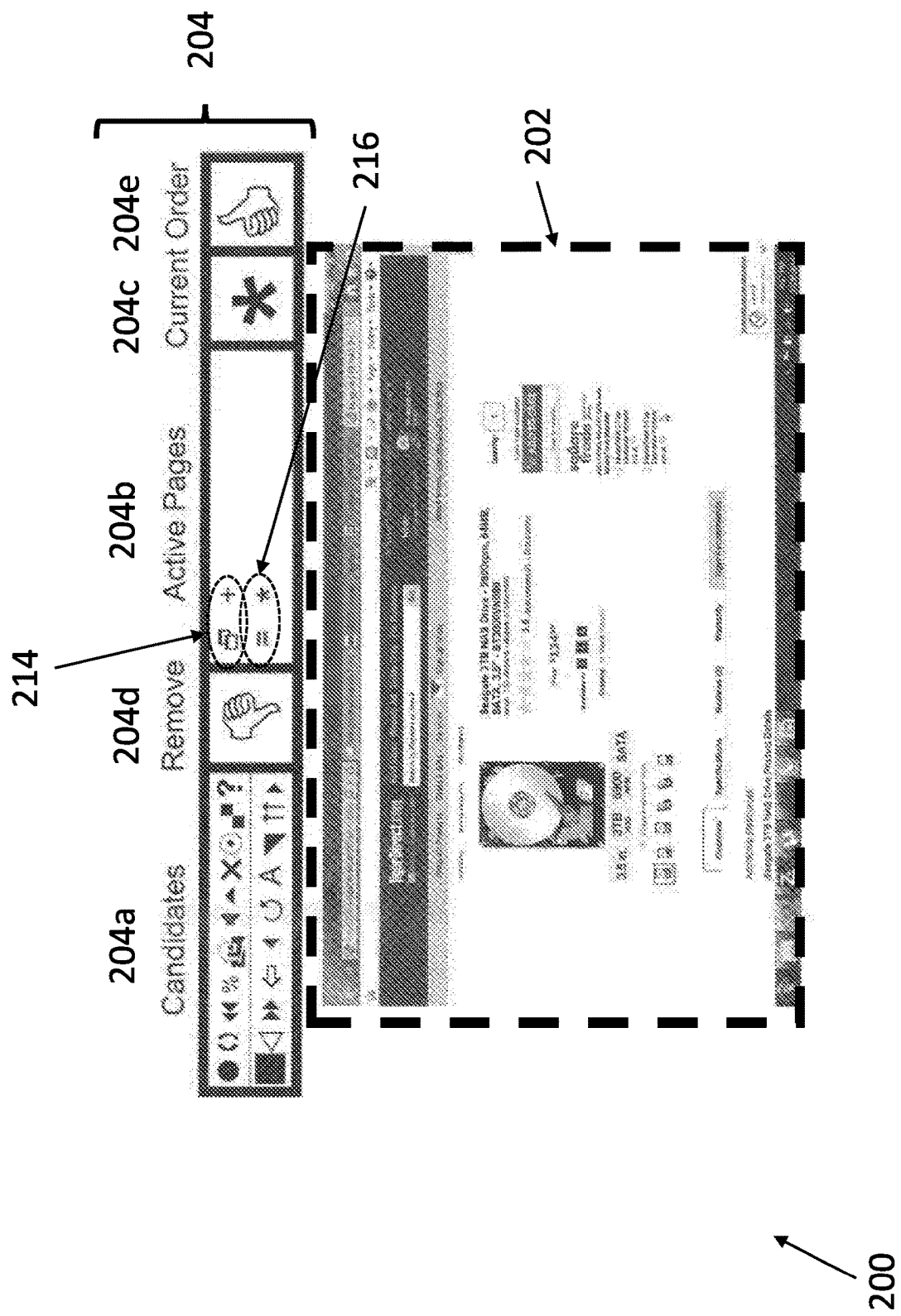
Figure 2F:
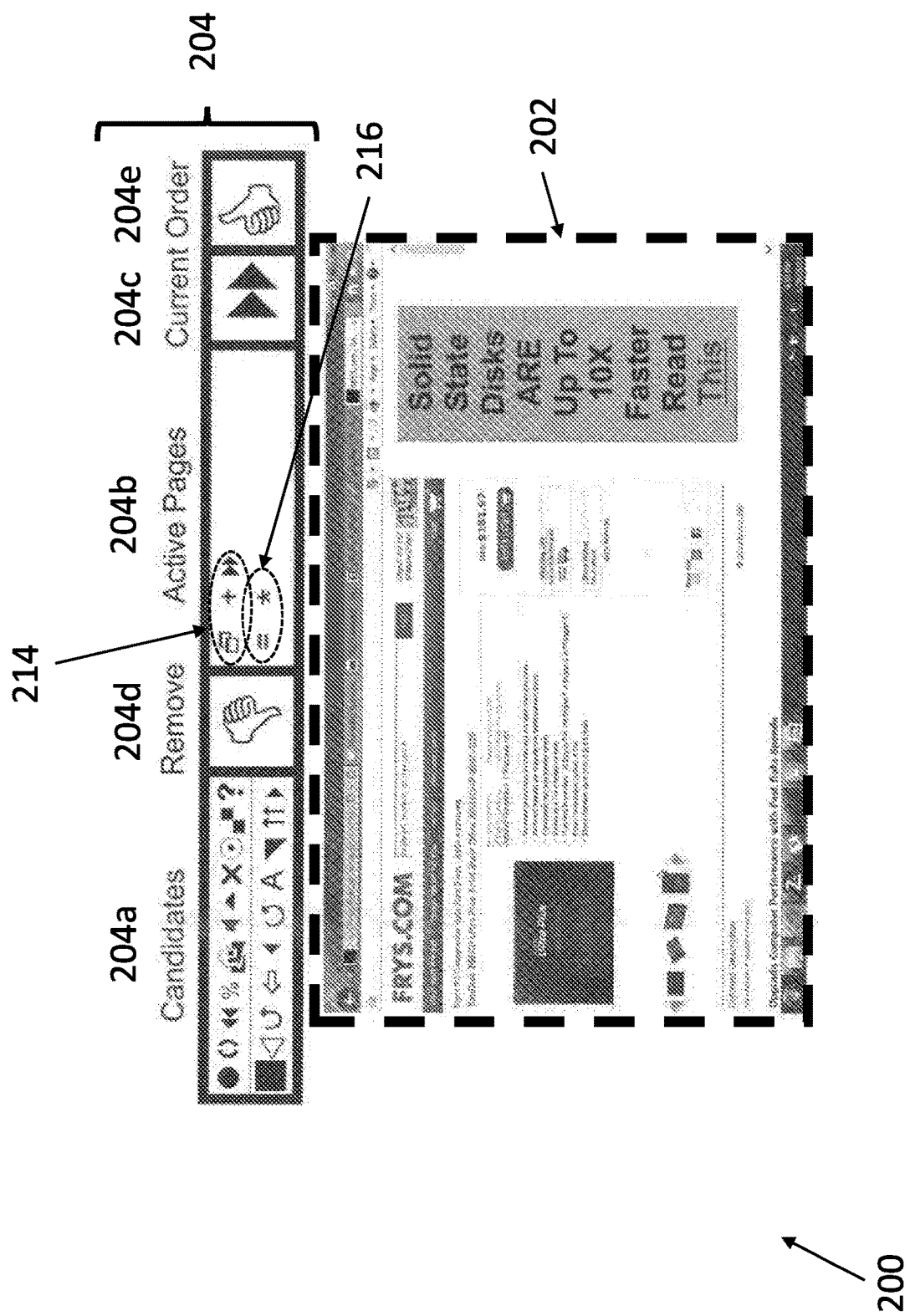

As shown in FIGS. 2D, 2E, and 2F, as further selections of items are made by the user, additional active icons are added to section 204*b*. Moreover, the active icons are arranged in sets (214, 216). In some embodiments, the icons can be manually added to each of the sets 214, 216, as the user identifies items on a website. In other embodiments, the user can icons manually to one set 214 and the DOT 204 can automatically create and select items for the second set 216. As discussed above, the DOT 204 can be configured to locate additional similar or equivalent items to build the second set 216 as items are added to the first set 214.

Figure 2G:
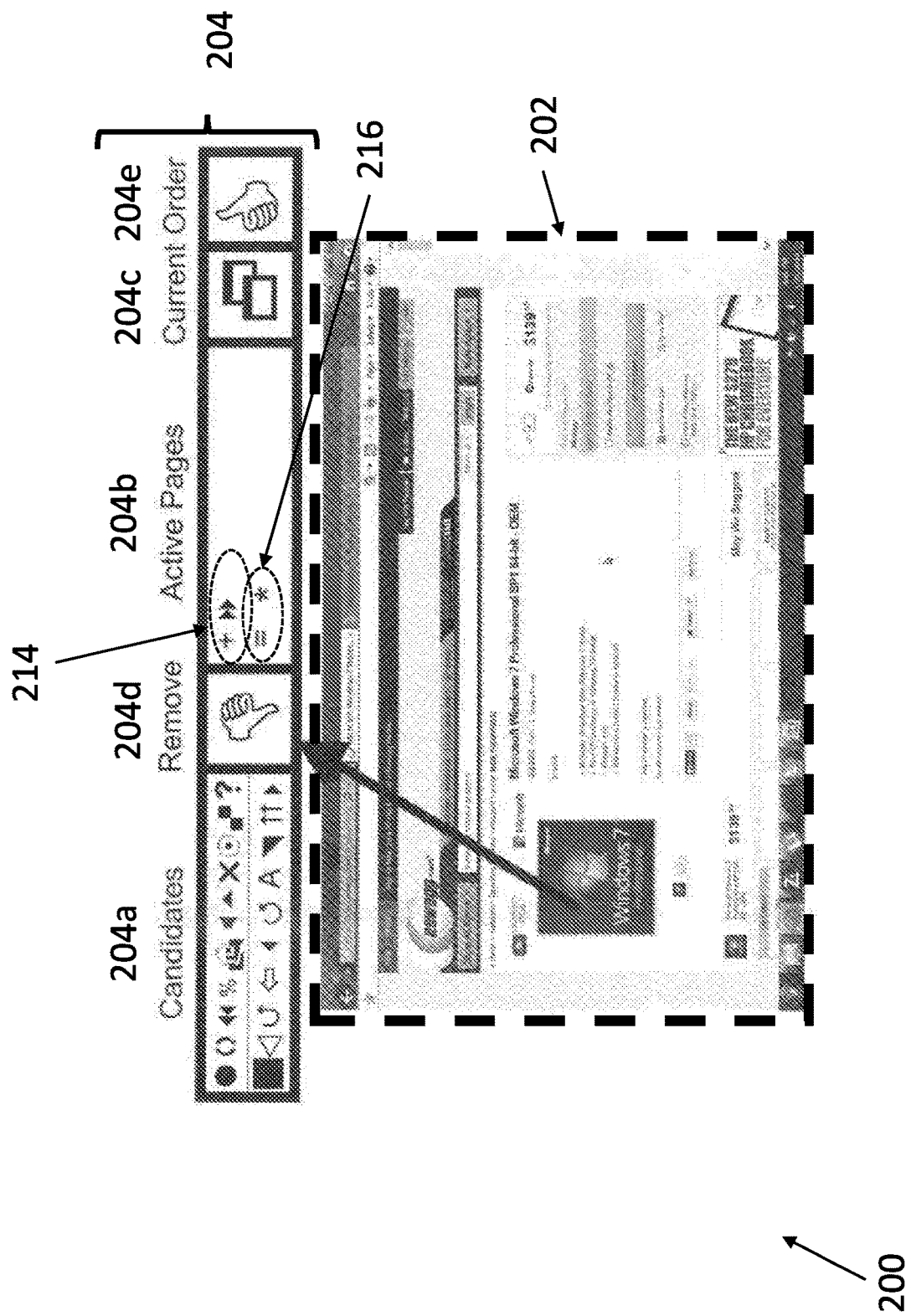
Figure 2H:
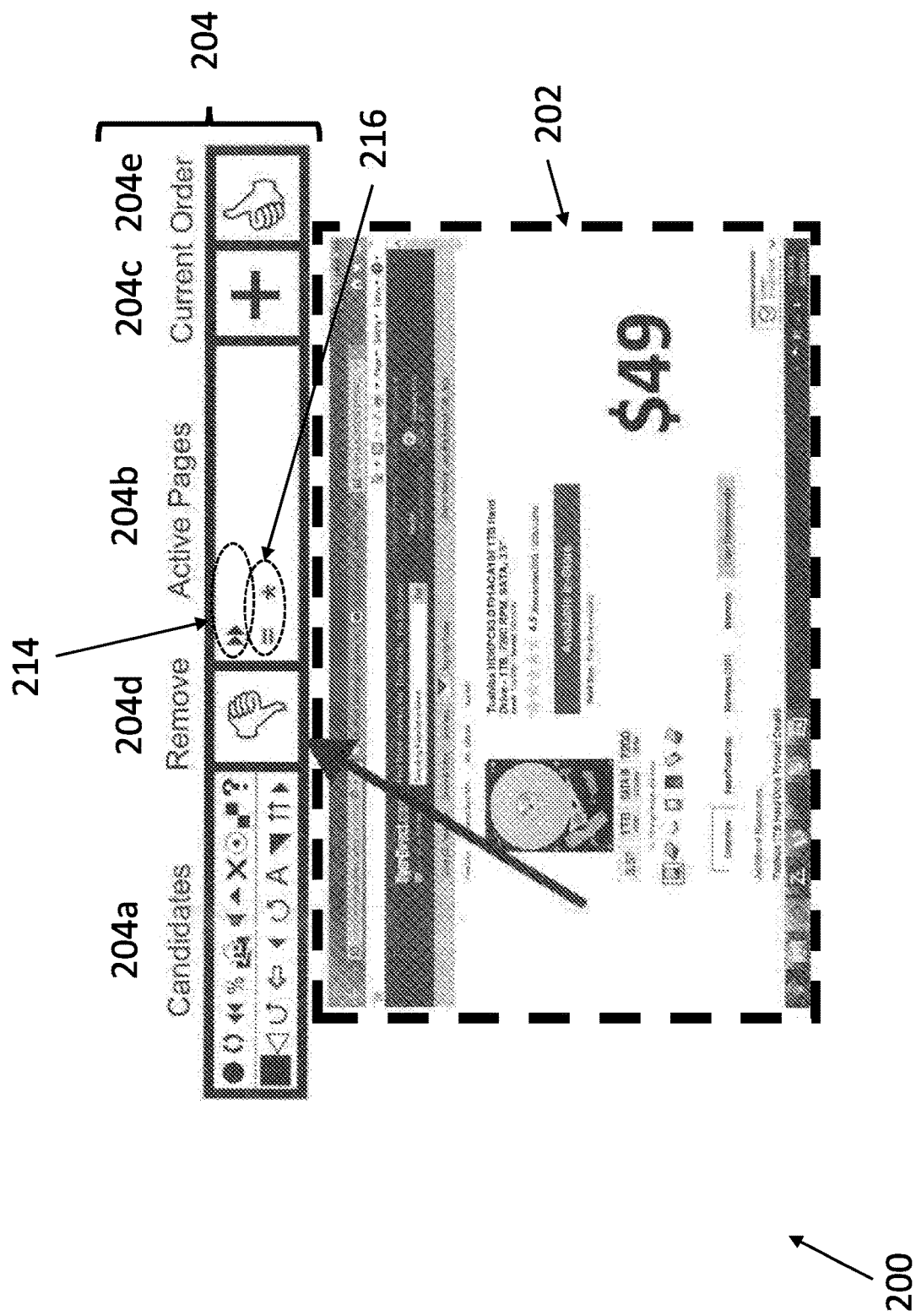
Figure 2I:
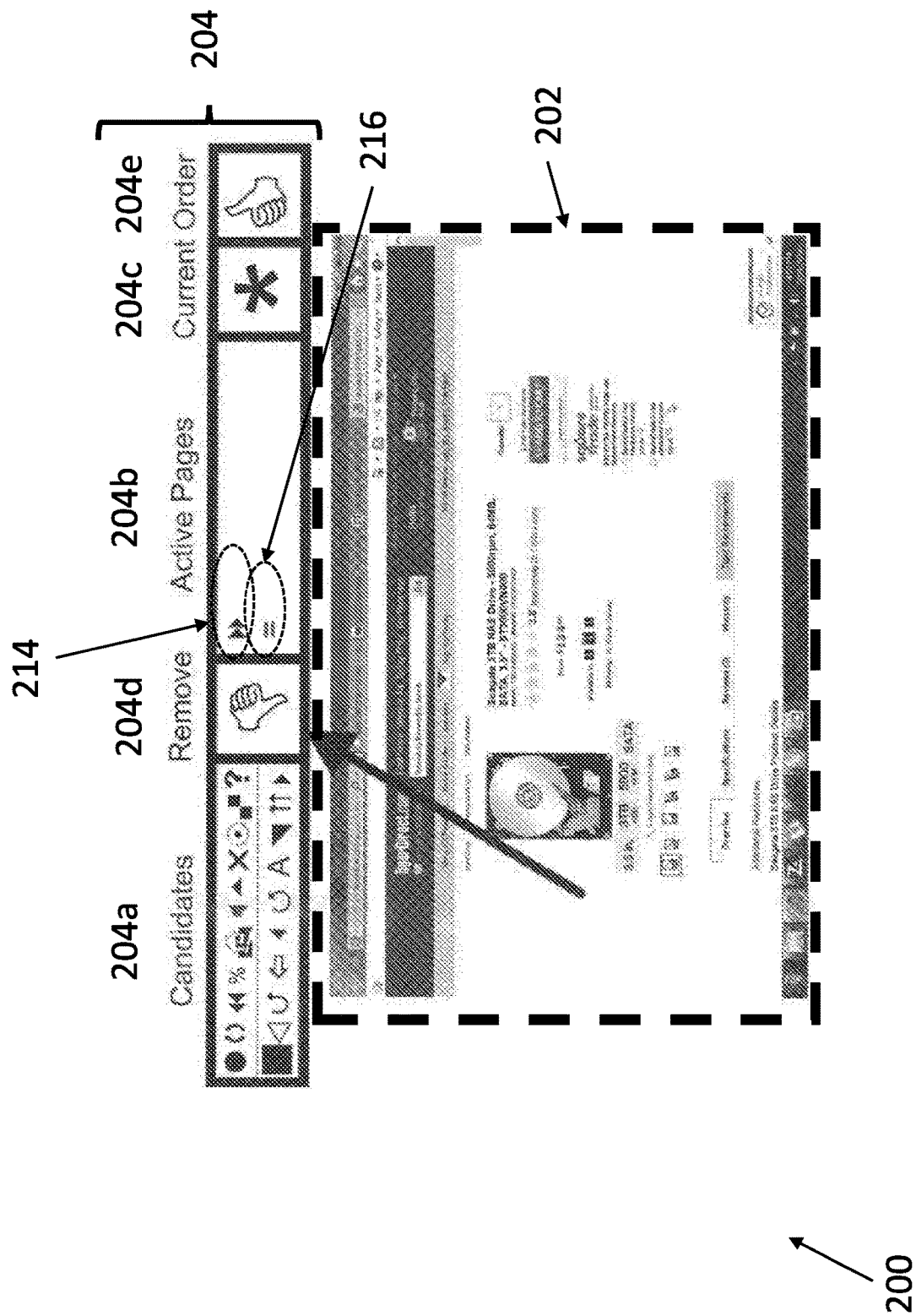

In addition to the foregoing features, the DOT 204 can also include controls to remove items. In some embodiments, as shown in FIGS. 2G, 2H, and 2I, the DOT 204 can include section 204*d*, which includes controls for removing items. The removal can be performed in a variety of ways. In certain embodiments, as user can select active icons associated with one or more items (or even all items) from one of the sets in the DOT 204. The controls for removing the items in section 204*d* can then be activated to remove the active icon. For example, as shown in FIG. 2G, selection of one of the active icons in set 214 and activation of the controls in section 204*d* results in the removal of the selected active icon from set 214 (compare FIGS. 2F and 2G). In other embodiments, the user can navigate to the web site associated with an active icon in a set and the activate the removal controls in section 204*d*. The DOT 204 can then analyze the web page, identify any active icons in section 204*b* corresponding to the web site, and remove the identified icons. In some cases, an active icon can simply be selected and directly deleted without using the removal controls in section 204*d*. For example, the active icon can be dragged out of section 204*b*, a delete key on a computing device can be pressed, or a right-click or other alternative action can be activate to provide access to a delete command.

In embodiments where the DOT 204 is used to manage multiple set, the removal of active icons can be accomplished in a variety of ways. In some embodiments, when a web site associated with an active icon is presented and the controls for removal are activated, the active icon can be removed from all sets in section 204*b*. In other embodiments, a user may select an active set or a default set may be defined. Thus, when a web site associated with an active icon is presented and the controls for removal are activated, the active icon can be removed only from the selected or default set in section 204*b*.

In some embodiments, when an active or default set is defined, actions on such a set can affect other sets. For example, if icons in set 216 are automatically added by the DOT 204 based on icons added to set 214, then the removal of an icon in set 214 can trigger the DOT 204 to remove the counterpart icon in set 216 representing the equivalent or similar item.

In some embodiments, removal of an active icon in one set can be accomplished by transferring active icons from another set. That is, if an active icon from set 216 is dragged or otherwise transferred to set 214, the DOT 204 can be configured to identify the corresponding active icon in set 214 and remove it in favor of the active icon from set 216.

In some embodiments, removal of an active icon from one set can cause an icon to be added to another set. For example, if an active icon from set 214 is removed, the DOT 204 can automatically add the corresponding active icon from set 216 in its place. In some configurations, the active icon can be temporary, as described above. Thus, further user action may be required to permanently include the active icon in set 214.

Figure 3:
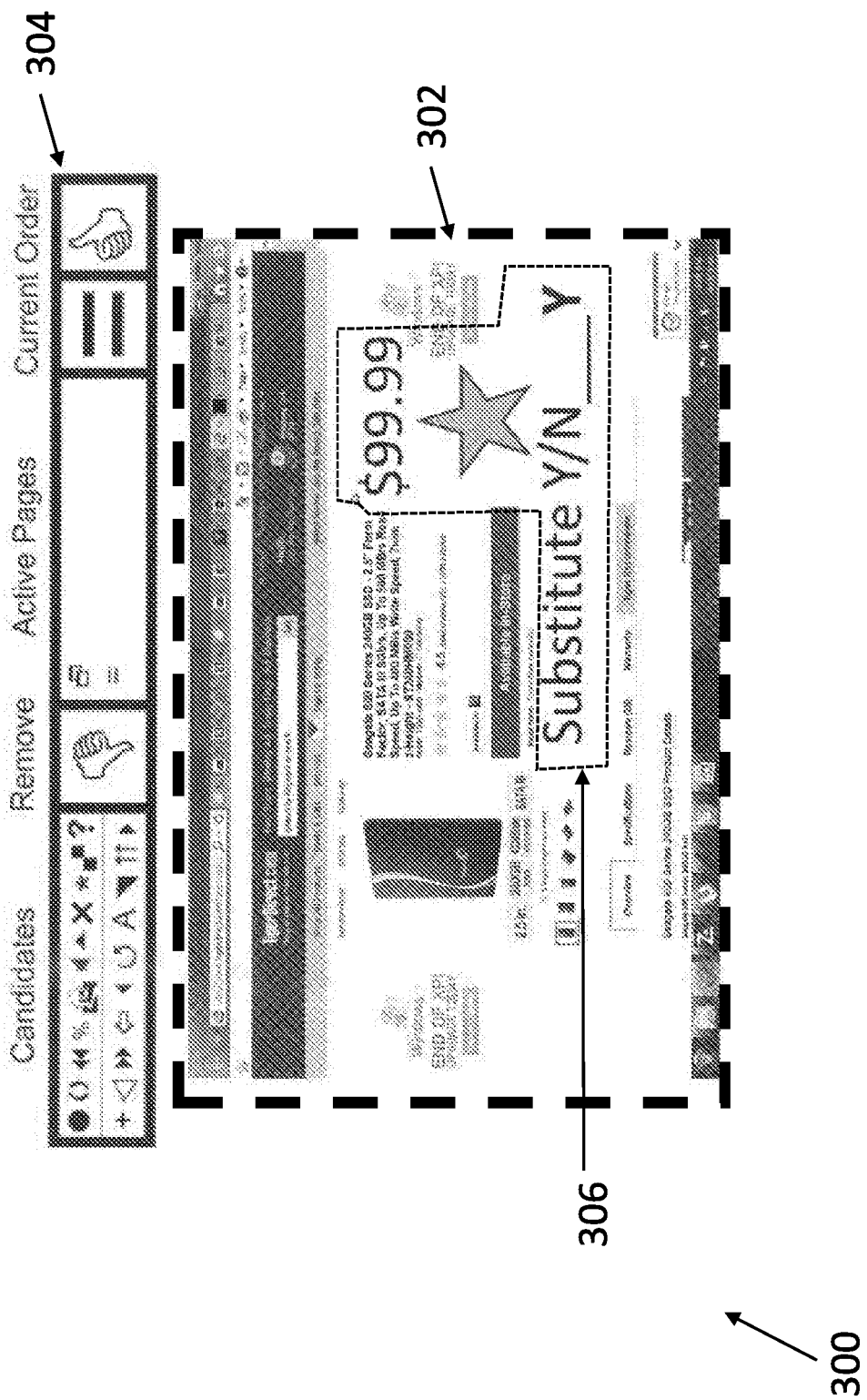
FIG. 3 shows a different configuration of a graphical user interface according to the various embodiments.

As noted above with respect to FIG. 2C, a notification can be provided in some cases. In some embodiments, the notification can include a prompt for the user. For example, as shown by the GUI 300 in FIG. 3, a notification 306 can overlay a web page 302 and include a prompt for the user. As discussed above, the notification can be generated by the associated DOT 304. In other configurations, the notification can be generated within the DOT 304 or other elements of the GUI 300, as previously discussed.

In certain embodiments, a DOT can be configured to include a means to input search parameters or other criteria. For example, the DOT can be configured to allow a user to select an icon and submit a query for a similar or equivalent item with certain characteristics. For example, a price range, a brand, ship time, or shipping costs, to name a few. This is illustrated in FIG. 4. A search assistant can suggest alternative decisions, or be authorized to select superior alternatives, say to select for lowest price when a product budget is enabling. If durability and reliability are paramount, and cost is less of a decision, all the alternatives developed by the Search Assistant would be biased along those priorities. This allows a designer to cost estimate, the highest performance, or highest reliability or least expensive variation on a theme and potentially define a collection of models.

Figure 5A:
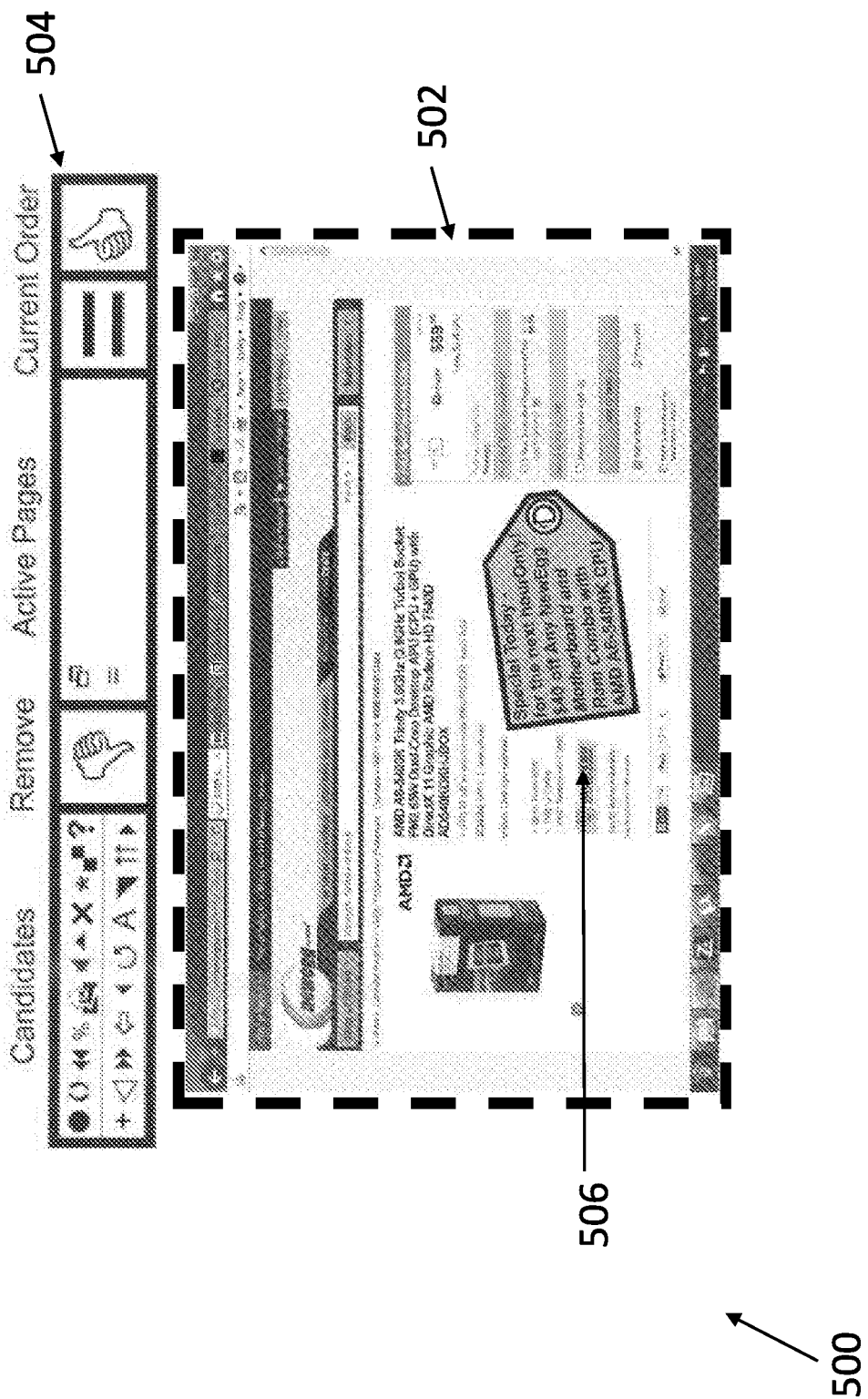
FIGS. 5A-5B show different configurations of a graphical user interface according to the various embodiments.
Figure 5B:
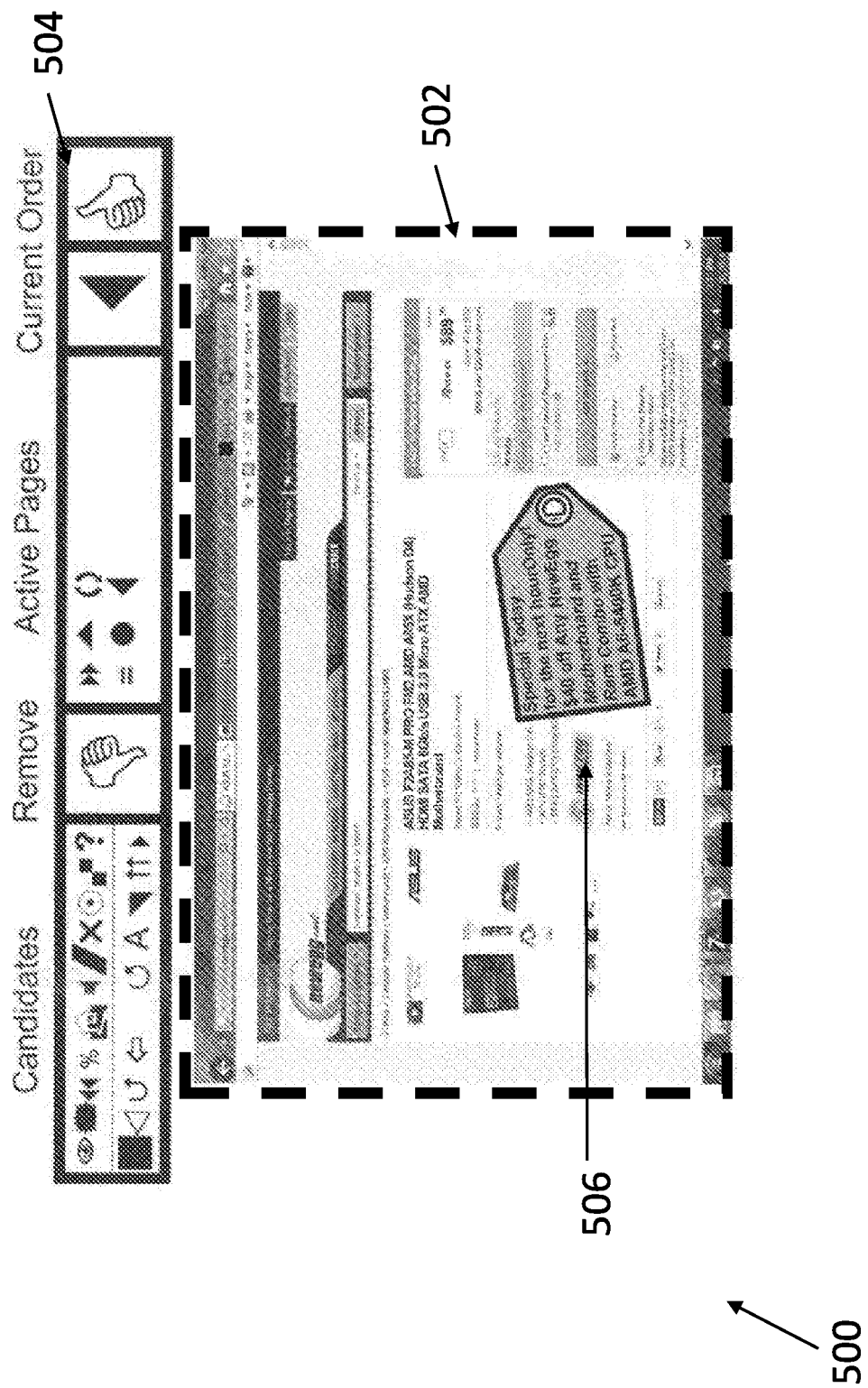

In some embodiments, the notifications can be configured to provide additional information. This is illustrated in FIG. 5A. As shown in the GUI 500 in FIG. 5, a notification 506 can be generated that indicates that there is some type of sale, discount, or other type of discount program associated with an item currently being viewed. The notification 506 can be generated by the DOT 504 and overlaid on web browser 502 or can be presented in any other way previously discussed. In operation, the DOT 504 can be configured to check for discount programs in the background and generate the notifications as such discount programs are uncovered. In certain configurations, the notification 506 can be used to navigate to other items associated with the discount program. For example, clicking on the notification 506 in FIG. 5A can cause the web browser to navigate to another web page, as shown in FIG. 5B. In this web page, the related item is shown. In some embodiments, the notification 506 can be maintained, as shown in FIG. 5B, allowing the user to click on the notification to switch between the two web pages as needed.

Figure 6:
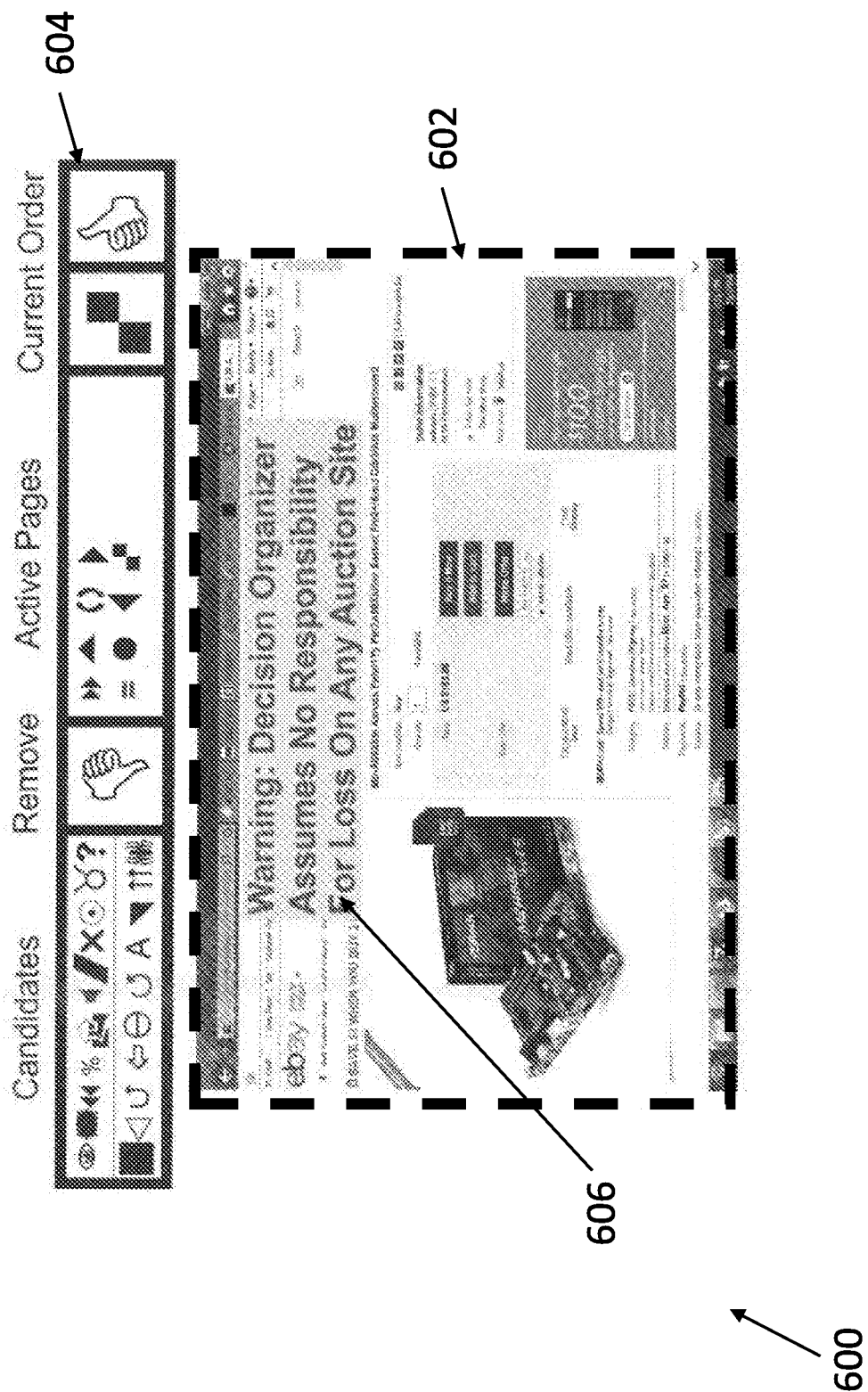
FIG. 6 shows a different configuration of a graphical user interface according to the various embodiments.

In some embodiments, the DOT can be configured to access or search for alternatives on a variety of sites, including auction sites. In such a configuration, the DOT can generate a notification to warn a user about potential issues with auction sites. This is illustrated in FIG. 6. FIG. 6 shows a GUI 600 in which the browser 602 has navigated to an auction website. In such a configuration, the DOT 602 can detect that the web site is an auction website and can generate an appropriate warning for the user in a notification 606. Such warnings can include warning regarding price, availability, loss, or any other relevant warnings about the auction process on the web site or the product being auctioned, such as its condition and/or age. In some embodiments, the DOT 604 can prevent access (e.g., prevent input by the user) to the web browser 602 until the user acknowledges the warning.

Figure 7:
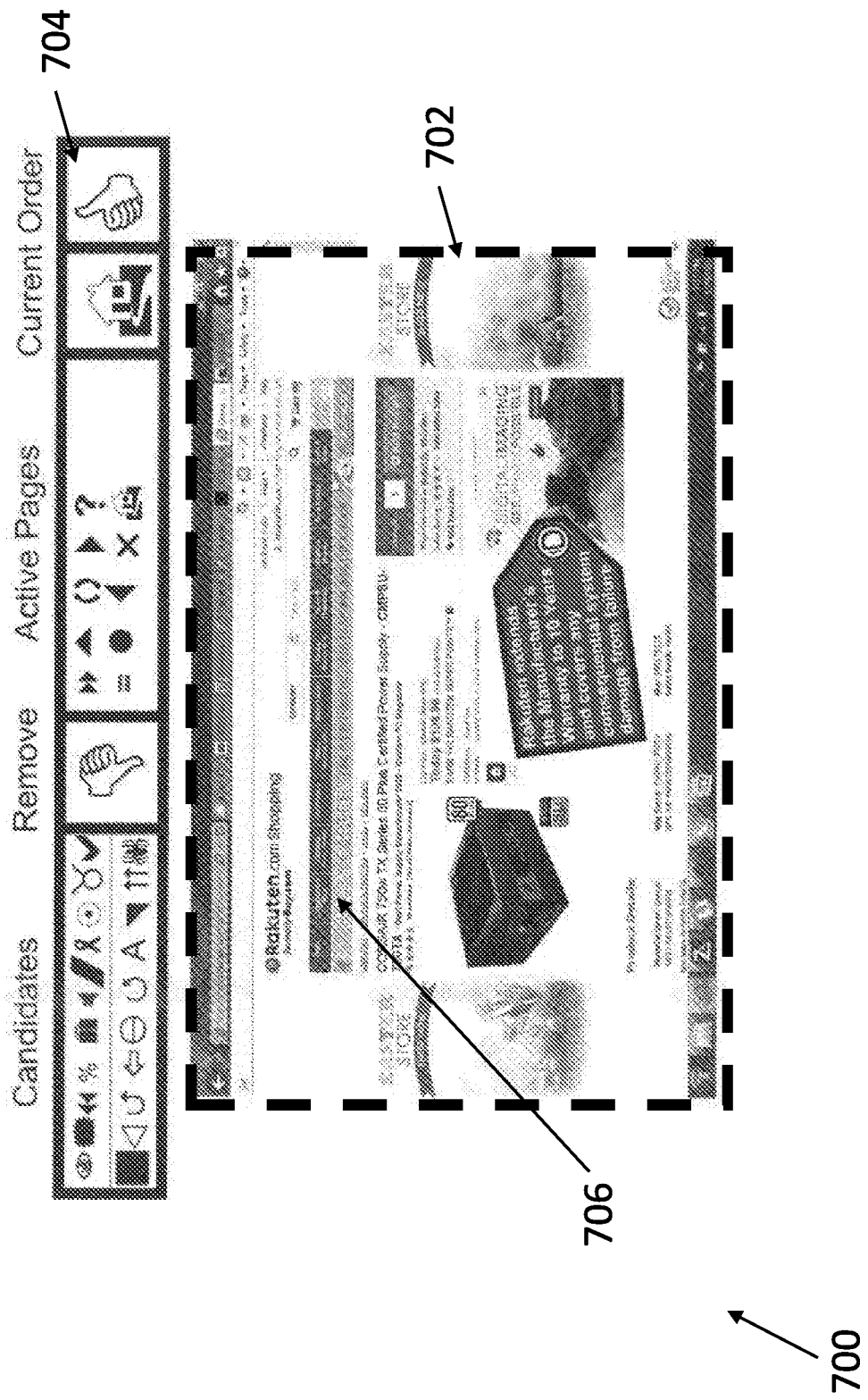
FIG. 7 shows a different configuration of a graphical user interface according to the various embodiments.

In some embodiments, as discussed above, the DOT can be configured to supply additional product information. In such a configuration, the DOT can generate a notification to provide this information. This is illustrated in FIG. 7. FIG. 7 shows a GUI 700 in which the browser 702 has navigated to a retailer website. In such a configuration, the DOT 702 can detect the web site and/or the product and generate a notification 706 including additional information. Such additional information can include warranty information, customer service information, customer review information, or any other information not readily available from the web page. This can include information from other web sites, including contradictory information. In some cases, the DOT 702 can be configured to access this information in the background and generate the notification as soon as it becomes available.

Figure 8:
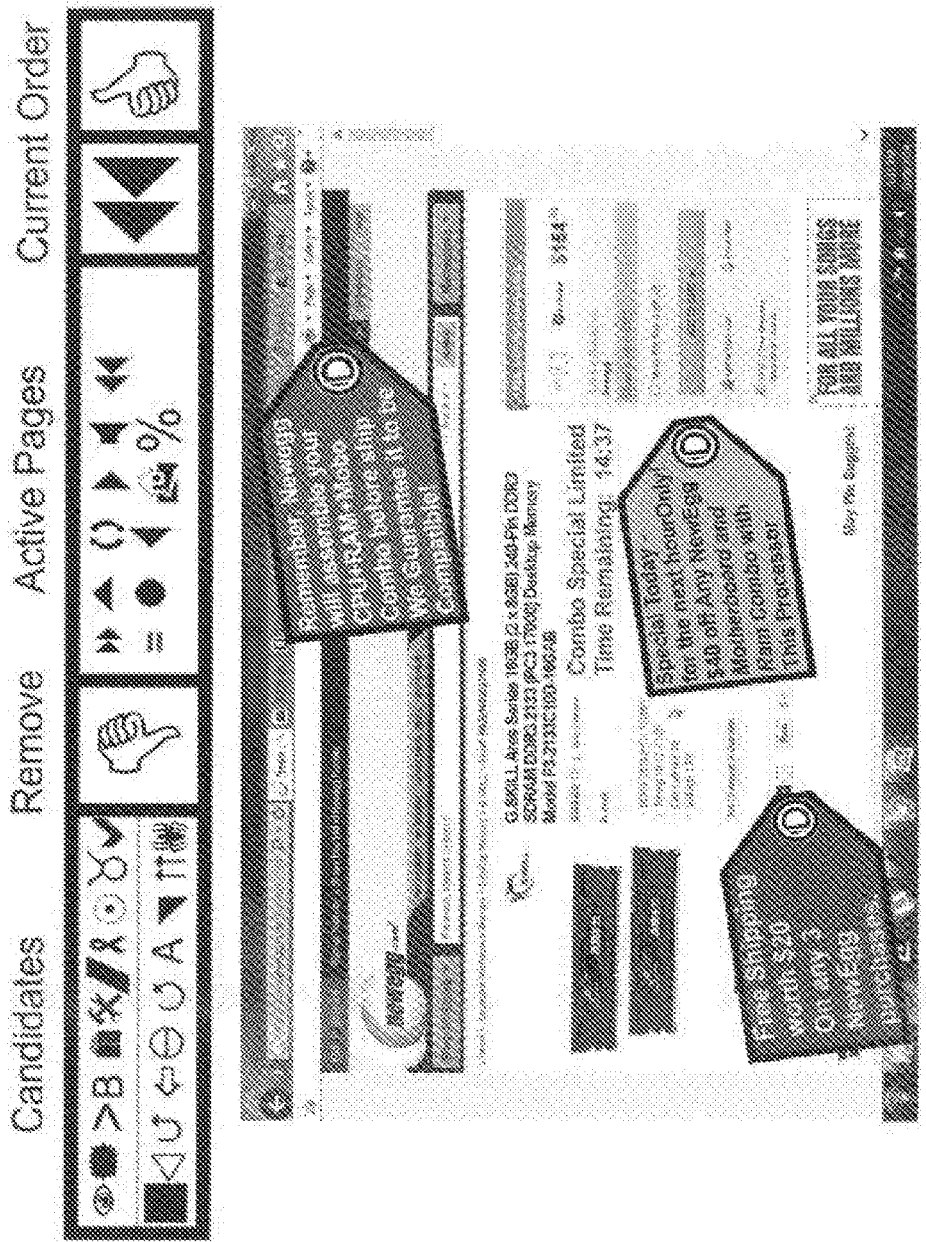
FIG. 8 shows a different configuration of a graphical user interface according to the various embodiments.

It should be noted that while various exemplary GUI's have been presented with only one notification, the various embodiments are not limited in this regard. Rather, the various notifications discussed above can be concurrently displayed in any combination. This is illustrated by the GUI 800 in FIG. 8.

Figure 9:
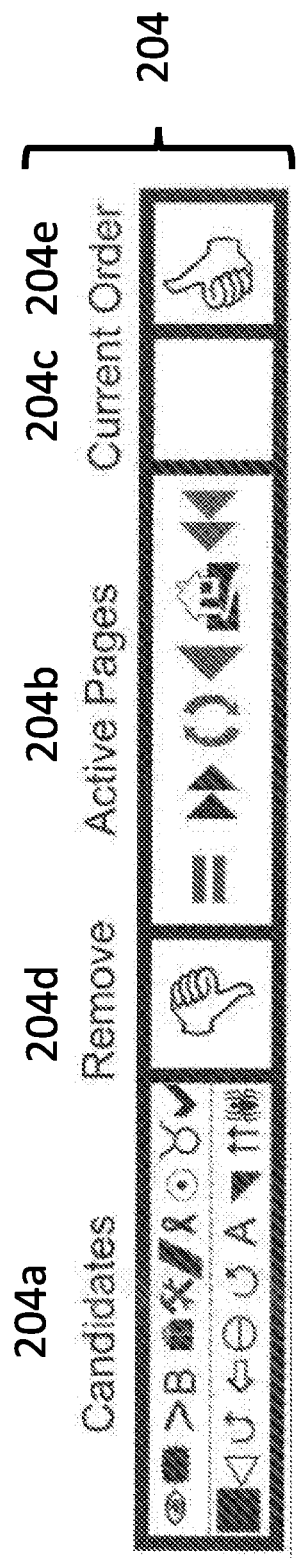
FIG. 9 shows the decision organizer tool of FIGS. 2A-2I.

Once a final set is selected by the user, the user can proceed to checkout using the DOT. For example, as shown in FIG. 9, the DOT 204 of FIGS. 2A-2I is presented with a final set selected. This can be accomplished by providing controls in the DOT 204 delete other sets or such unwanted sets can be deleted manually. As discussed above, the active icons in the set presented in the final set in section 204b can be used to review the items selected. At this point, if the user is satisfied with the set, the user can access the order controls in section 204e. This causes an ordering function of the DOT 204 to be initiated. In some embodiments, if multiple sets are still detected, the DOT 204 can query the user for further instructions.

The ordering function of the DOT can perform several steps in the various embodiments. For the items selected from a retailer, the DOT can determine if any discounts are available and apply them as needed. The DOT can also request payment information from the user. For example, the DOT can generate a UI, as shown in FIG. 10 to request payment information from the user.

Thereafter, the DOT can automatically complete the transactions with the various retailers in the background. Finally, the DOT can deliver information for the user to obtain invoices. For example, an email or a UI. An exemplary UI is shown in FIG. 11 in which each item purchased is listed, long with its final cost and links to the invoices or receipts associated with the retailer.

Using existing infrastructure, for minimal disruption to current banking and electronic commerce means, the DOT can function as a Buyer through which every money transmitter has an agreement with a given vendor. The DOT also functions as a seller through one (or more) money transmitters to the eventual buyer. That is, the DOT can be a transaction intermediary between one or more seller and one or more buyers. The DOT therefore provides a common language between sellers and buyers who may be restricted to a single purchase protocol. For example, sellers on eBay may be limited to Paypal transactions only, but through the DOT buyers using only Google Wallet can purchase directly from such sellers for one or more purchases. Thus, the DOT can be used to allow transactions via multiple protocols without requiring the user to have accounts supporting all of the multiple protocols. Thus, the DOT can be configured to effectively operate as an intermediary and perform two or more transactions for each item purchased, one using the buyer's protocol and another using the seller's protocol, in order to complete the sale of the item. This is schematically illustrated in FIG. 12.

Figure 12:
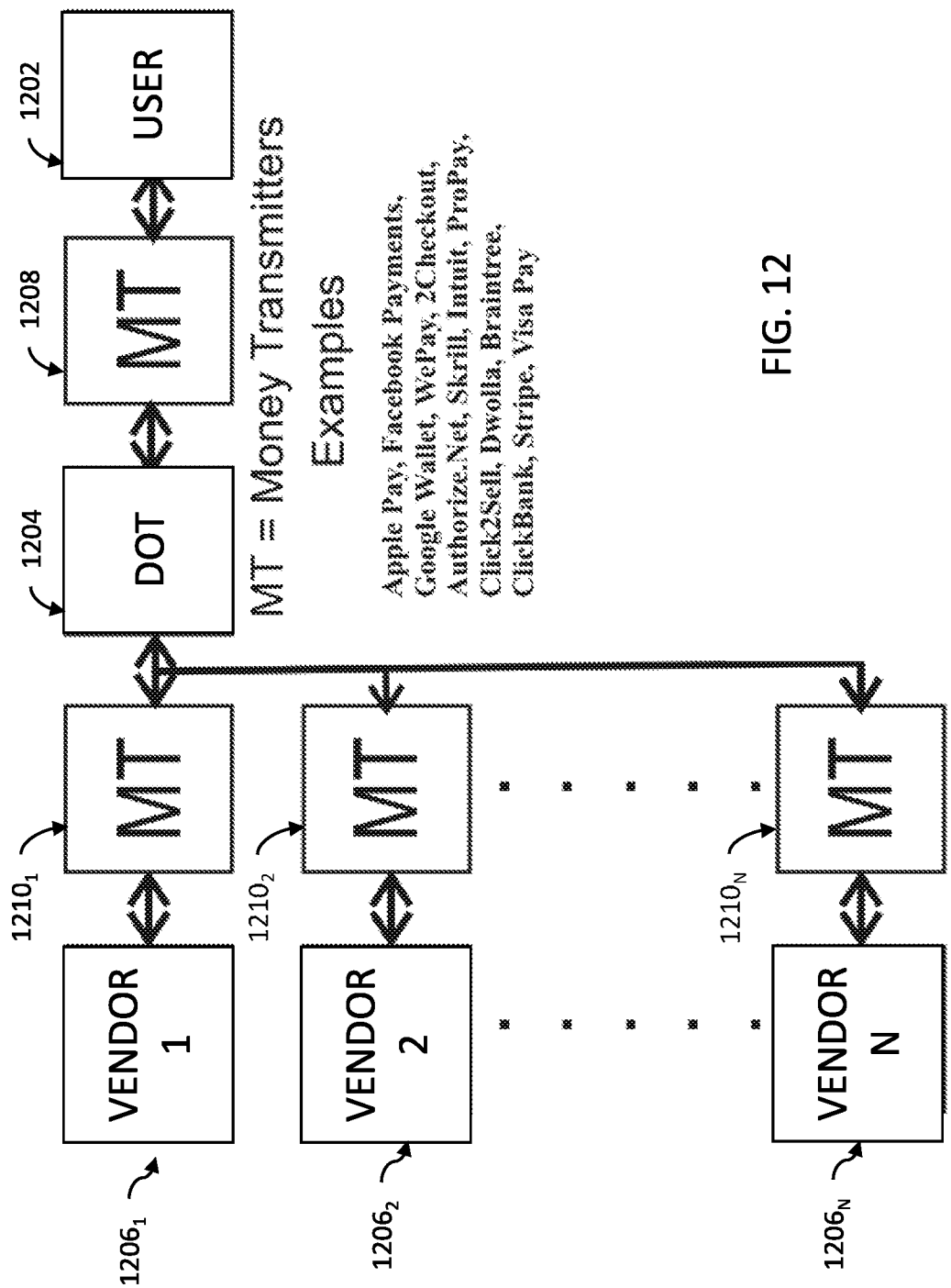
FIG. 12 shows how a DOT operates as an intermediary using existing monetary transmitters.

As shown in FIG. 12, a user 1202 can utilize a DOT 1204 to purchase items from multiple vendors $1206_1$-$1206_N$. To complete the purchase of the items, the user 1202 can engage with the DOT 1204 via money transmitter 1208. The DOT 1204 can then complete the transaction with the money transmitter 1208 to secure the funds for the items. Thereafter or contemporaneously, the DOT 1204 can also engage in separate transactions with vendor money transmitters $1210_1$-$1210_N$. The individual transactions can then be used to complete the orders from the user 1202 for the items.

Although the various money transmitters identified in FIG. 12 are associated with the purchase of goods, the various embodiments are not limited in this regard. Rather, the present disclosure contemplates that the money transmitters can be any type of payment system appropriate for the goods and services being exchanged. For example, in the case of medical goods and services, the money transmitters can include insurance systems, hospital financial systems, or any other type of system to be used from making payment a medical provider or entity.

Figure 13:
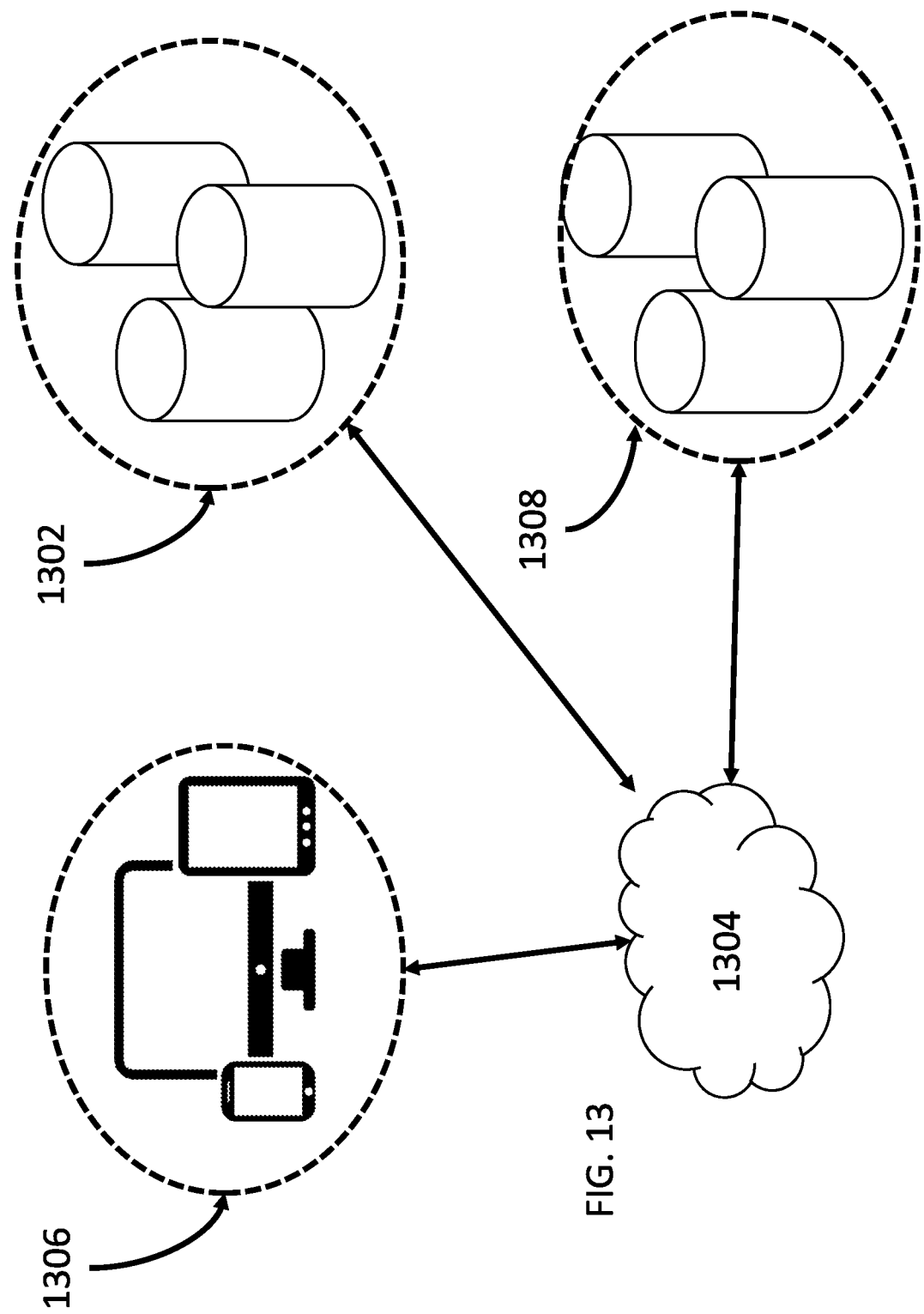
FIG. 13 shows a network configuration according to the various embodiments.

In some configurations, the DOT at a user device can operate independently or as part of a larger system. In some instances, the DOT can operate as a separate browser window. Alternative, the DOT can operate as a separate program running on a user device. That is, the DOT as a user device can be configured to operate as a portal to a DOT server. An exemplary arrangement for such a configuration is illustrated in FIG. 13. As shown in FIG. 13, a DOT server (or server system) 1302 can be connected via a network connection 1304 to one or more user devices 1306 with a DOT interface accessing retailer systems 1308. The DOT server 1302 can then perform the various functions described above. In such a configuration, the background data collection process can be simplified. In particular, as user devices 1306 access retailer systems 1308, the items accessed and any information regarding such items can be stored by the DOT server 1302. Thereafter, the DOT server 1302 can first access its own records to determine if additional information or alternative items, as described above, can be provided to any of the user devices 1306 during a session.

At least in the configuration of FIG. 13, the DOT server 1302 can be configured to have a heuristic protocol. That is, since retailer 1308 can have different checkout protocols, the DOT 1302 can be configured to learn such protocols for future use with different user devices 1306.

Figure 14A:
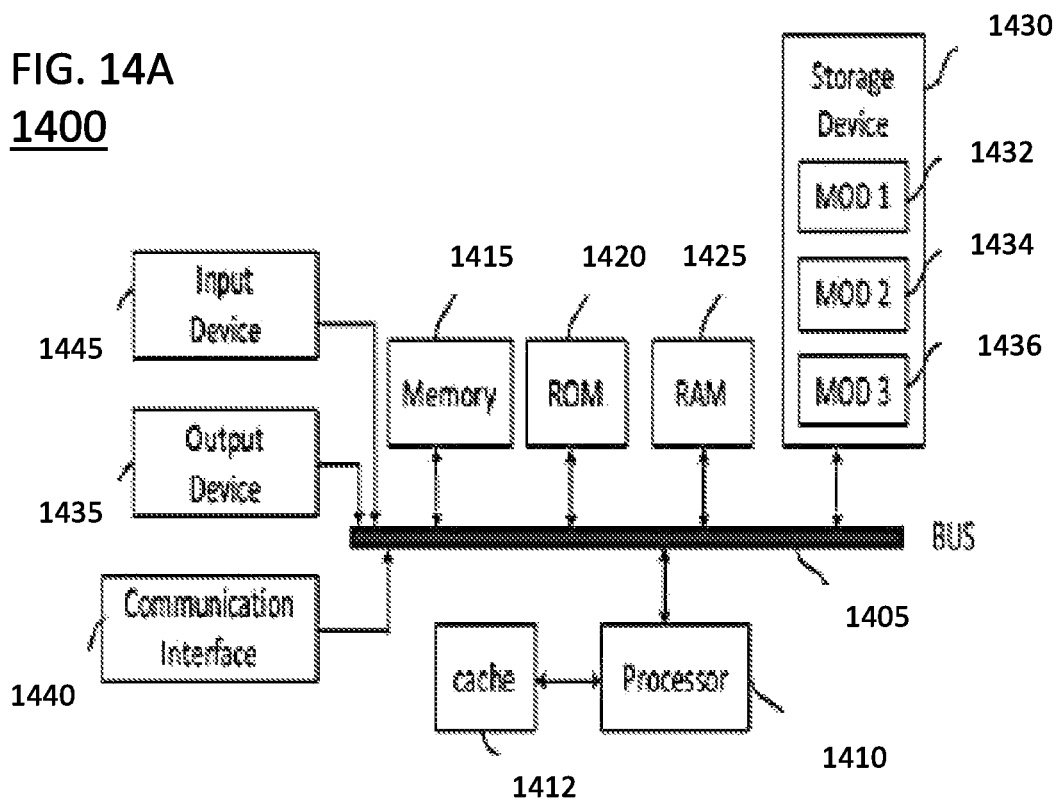
FIGS. 14A and 14B show a computer system for implementing or more aspects of the various embodiments.
Figure 14B:
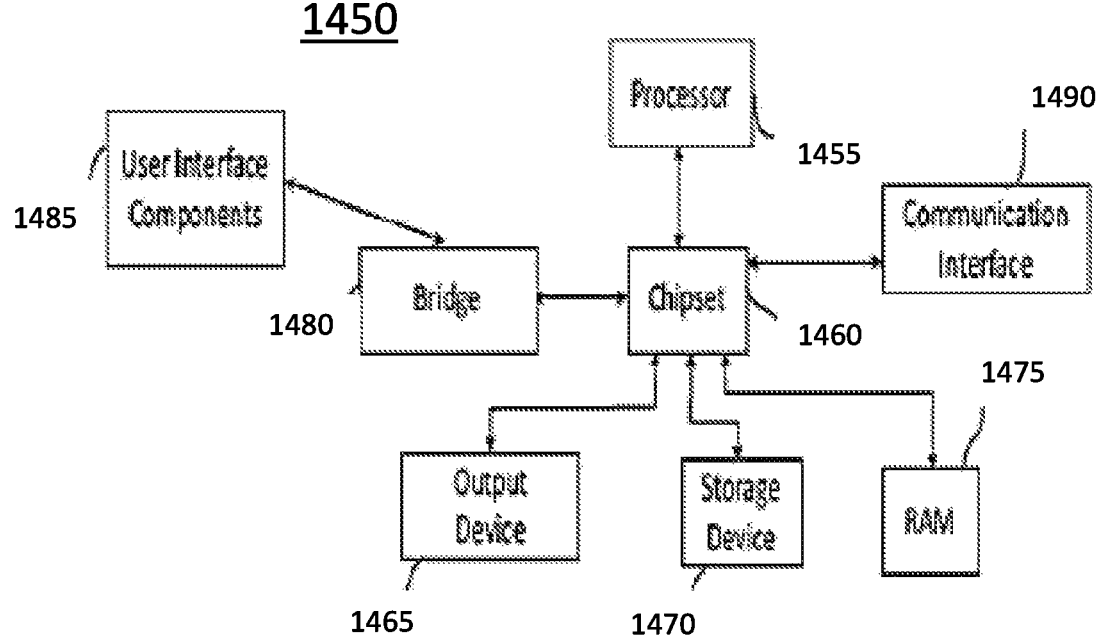

FIG. 14A, and FIG. 14B illustrate exemplary possible system configurations. The more appropriate configuration will be apparent to those of ordinary skill in the art when practicing the present technology. Persons of ordinary skill in the art will also readily appreciate that other system configurations are possible.

FIG. 14A illustrates a conventional system bus computing system architecture 1400 wherein the components of the system are in electrical communication with each other using a bus 1405. Exemplary system 1400 includes a processing unit (CPU or processor) 1410 and a system bus 1405 that couples various system components including the system memory 1415, such as read only memory (ROM) 1420 and random access memory (RAM) 1425, to the processor 1410. The system 1400 can include a cache of high-speed memory connected directly with, in close proximity to, or integrated as part of the processor 1410. The system 1400 can copy data from the memory 1415 and/or the storage device 1430 to the cache 1412 for quick access by the processor 1410. In this way, the cache can provide a performance boost that avoids processor 1410 delays while waiting for data. These and other modules can control or be configured to control the processor 1410 to perform various actions. Other system memory 1415 may be available for use as well. The memory 1415 can include multiple different types of memory with different performance characteristics. The processor 1410 can include any general purpose processor and a hardware module or software module, such as module 1 1432, module 2 1434, and module 3 1436 stored in storage device 1430, configured to control the processor 1410 as well as a special-purpose processor where software instructions are incorporated into the actual processor design. The processor 1410 may essentially be a completely self-contained computing system, containing multiple cores or processors, a bus, memory controller, cache, etc. A multi-core processor may be symmetric or asymmetric.

To enable user interaction with the computing device 1400, an input device 1445 can represent any number of input mechanisms, such as a microphone for speech, a touch-sensitive screen for gesture or graphical input, keyboard, mouse, motion input, speech and so forth. An output device 1435 can also be one or more of a number of output mechanisms known to those of skill in the art. In some instances, multimodal systems can enable a user to provide multiple types of input to communicate with the computing device 1400. The communications interface 1440 can generally govern and manage the user input and system output. There is no restriction on operating on any particular hardware arrangement and therefore the basic features here may easily be substituted for improved hardware or firmware arrangements as they are developed.

Storage device 1430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1425, read only memory (ROM) 1420, and hybrids thereof.

The storage device 1430 can include software modules 1432, 1434, 1436 for controlling the processor 1410. Other hardware or software modules are contemplated. The storage device 1430 can be connected to the system bus 1405. In one aspect, a hardware module that performs a particular function can include the software component stored in a computer-readable medium in connection with the necessary hardware components, such as the processor 1410, bus 1405, display 1435, and so forth, to carry out the function.

FIG. 14B illustrates a computer system 1450 having a chipset architecture that can be used in executing the described method and generating and displaying a graphical user interface (GUI). Computer system 1450 is an example of computer hardware, software, and firmware that can be used to implement the disclosed technology. System 1450 can include a processor 1455, representative of any number of physically and/or logically distinct resources capable of executing software, firmware, and hardware configured to perform identified computations. Processor 1455 can communicate with a chipset 1460 that can control input to and output from processor 1455. In this example, chipset 1460 outputs information to output 1465, such as a display, and can read and write information to storage device 1470, which can include magnetic media, and solid state media, for example. Chipset 1460 can also read data from and write data to RAM 1475. A bridge 1480 for interfacing with a variety of user interface components 1485 can be provided for interfacing with chipset 1460. Such user interface components 1485 can include a keyboard, a microphone, touch detection and processing circuitry, a pointing device, such as a mouse, and so on. In general, inputs to system 1450 can come from any of a variety of sources, machine generated and/or human generated.

Chipset 1460 can also interface with one or more communication interfaces 1490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1455 analyzing data stored in storage 1470 or 1475. Further, the machine can receive inputs from a user via user interface components 1485 and execute appropriate functions, such as browsing functions by interpreting these inputs using processor 1455.

It can be appreciated that exemplary systems 1400 and 1450 can have more than one processor 1410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some configurations the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method of displaying product information relating to multiple purchase options, the method comprising:
    displaying, in a first portion of a user interface at a user terminal, a web browser;
    automatically generating, based at least in part on a plurality of windows or tabs in the web browser, a plurality of candidate icons, each of the plurality of candidate icons being associated with a corresponding item offered for sale on a corresponding window or tab of the plurality of windows or tabs in the web browser;
    displaying, in a second portion of the user interface at the user terminal, a decision organizing tool (DOT) comprising a candidate icon portion and an active icon portion, the candidate icon portion including the plurality of candidate icons;
    receiving, at the user terminal, input search parameters associated with a product of interest;
    based at least in part on the received input search parameters associated with the product of interest, receiving instructions to transfer a first candidate icon of the plurality of candidate icons from the candidate icon portion to the active icon portion, the first candidate icon being associated with a first item offered for sale that is related to the product of interest;
    transferring the first candidate icon of the plurality of candidate icons to the active icon portion, wherein the first candidate icon provides a link to the first item offered for sale; and
    providing a single purchase protocol for corresponding items offered for sale associated with the first candidate icon and a set of active icons in the active icon portion, the single purchase protocol including:
        accessing a first vendor associated with the first candidate icon to determine a first purchase option;
        accessing at least a second vendor associated with at least one active icon of the set of active icons to determine at least a second purchase option;
        based at last in part on the first purchase option and at least the second purchase option, presenting a single payment transaction via the user interface; and
        performing a first purchase transaction for the first vendor and at least a second purchase transaction for at least the second vendor.

2. The method of claim 1, wherein each of the plurality of candidate icons is pre-associated with the corresponding item offered for sale on the corresponding window or tab of the plurality of windows or tabs in the web browser.

3. The method of claim 1, wherein the first candidate icon of the plurality of candidate icons is configured to provide a graphical representation of the first item offered for sale on the corresponding window or tab of the plurality of windows or tabs in the web browser.

4. The method of claim 1, further comprising:
    associating the first candidate icon of the plurality of candidate icons with the set of active icons in the active icon portion; and
    in response to (i) the receiving the instructions and (ii) the transferring the first candidate icon of the plurality of candidate icons to the active icon portion, moving a second candidate icon of the plurality of candidate icons to the active icon portion, wherein the second candidate icon provides a link to a second item equivalent to the first item offered for sale on the corresponding window or tab of the plurality of windows or tabs in the web browser, and wherein the first candidate icon is associated with a different retailer from the second candidate icon.

5. The method of claim 1, further comprising:
displaying, in the second portion of the user interface, an indicia of a relationship between (i) a web site currently presented in the web browser in the first portion of a user interface and (ii) any icons in the active icon portion, wherein the relationship includes whether any item associated with the any icons in the active icon portion is equivalent to an item associated with the web site currently presented in the web browser; and
in response to a first active icon in the active icon portion being equivalent to the item associated with the web site currently presented in the web browser, incrementing a count of the item by at least one.

6. The method of claim 1, further comprising:
detecting additional information associated with the product of interest and each corresponding item offered for sale on the corresponding window or tab of the plurality of windows or tabs in the web browser; and
in response to the detecting the additional information, generating a notification in the user interface at the user terminal, wherein the notification is associated with the detected additional information, the notification being associated with an incentive program associated with the product of interest.

7. The method of claim 6, wherein the notification further comprises a prompt for the user to select an icon and submit a query for a similar or equivalent item based at least in part on the received input search parameters associated with the product of interest, the similar or equivalent item being associated with a different incentive program.

8. The method of claim 1, further comprising:
detecting, via the DOT, one or more alternatives to the product of interest among each item offered for sale on the corresponding window or tab of the plurality of windows or tabs in the web browser; and
in response to the detecting the one or more alternatives, generating a notification in the user interface prompting the user to consider the one or more alternatives.

9. A system for displaying product information relating to multiple purchase options, the system, comprising:
a processor;
a user terminal having a user interface, the user interface being configured to display a web browser; and
a memory having stored thereon computer program, the computer program comprising a plurality of code sections for causing the processor to:
display, in a first portion of the user interface at the web browser, the web browser;
generating, based at least in part on a plurality of windows or tabs in the web browser, a plurality of candidate icons, each of the plurality of candidate icons being associated with a corresponding item offered for sale on a corresponding window or tab of the plurality of windows or tabs in the web browser;
display, in a second portion of the user interface at the user terminal, a decision organizing tool (DOT) comprising a candidate icon portion and an active icon portion, the candidate icon portion including the plurality of candidate icons;
receive, at the user terminal, input search parameters associated with a product of interest;

based at least in part on the received input search parameters associated with the product of interest, receive instructions to transfer a first candidate icon of the plurality of candidate icons from the candidate icon portion to the active icon portion, the first candidate icon being associated with a first item offered for sale that is related to the product of interest;
transfer the first candidate icon of the plurality of candidate icons to the active icon portion, wherein the first candidate icon provides a link to the first item offered for sale; and
provide a single purchase protocol for corresponding items offered for sale associated with the first candidate icon and a set of active icons in the active icon portion, the single purchase protocol including:
accessing a first vendor website associated with the first candidate icon to determine a first purchase option;
accessing at least a second vendor website associated with at least one active icon of the set of active icons to determine at least a second purchase option;
based at last in part on the first purchase option and at least the second purchase option, presenting a single payment transaction via the user interface; and
performing a first purchase transaction for the first vendor website and at least a second purchase transaction for at least the second vendor website.

10. The system of claim 9, wherein each of the plurality of candidate icons is pre-associated with the corresponding item offered for sale on the corresponding window or tab of the plurality of windows or tabs in the web browser.

11. The system of claim 9, wherein the first candidate icon of the plurality of candidate icons is configured to provide a graphical representation of the first item offered for sale on the corresponding window or tab of the plurality of windows or tabs in the web browser.

12. The system of claim 9, the computer program further comprising additional code sections for causing the processor to:
associating the first candidate icon of the plurality of candidate icons with the set of active icons in the active icon portion; and
in response to (i) the receiving the instructions and (ii) the transferring the first candidate icon of the plurality of candidate icons to the active icon portion, move a second candidate icon of the plurality of candidate icons to the active icon portion, wherein the second candidate icon provides a link to a second item equivalent to the first item offered for sale on the corresponding window or tab of the plurality of windows or tabs in the web browser, and wherein the first candidate icon is associated with a different vendor from the second candidate icon.

13. The system of claim 9, the computer program further comprising additional code sections for causing the processor to:
display, in the second portion of the user interface, an indicia of a relationship between (i) a web site currently presented in the web browser in the first portion of a user interface and (ii) any icons in the active icon portion, wherein the relationship includes whether any item associated with the any icons in the active icon portion is equivalent to an item associated with the web site currently presented in the web browser; and in response to a first active icon in the active icon portion being equivalent to the item associated with the web site currently presented in the web browser, incrementing a count of the item by at least one.

14. The system of claim 9, the computer program further comprising additional code sections for causing the processor to:

detect additional information associated with the product of interest and each corresponding item offered for sale on the corresponding window or tab of the plurality of windows or tabs in the web browser; and in response to the detecting the additional information, generating a notification in the user interface at the user terminal, wherein the notification is associated with the detected additional information, the notification being associated with an incentive program associated with the product of interest.

15. The system of claim 14, wherein the notification further comprises a prompt for the user to select an icon and submit a query for a similar or equivalent item based at least in part on the received input search parameters associated with the product of interest, the similar or equivalent item being associated with a different incentive program.

16. The system of claim 9, the computer program further comprising additional code sections for causing the processor to:

detect, via the DOT, one or more alternatives to the product of interest among each item offered for sale on the corresponding window or tab of the plurality of windows or tabs in the web browser; and in response to the detecting the one or more alternatives, generate a notification in the user interface prompting the user to consider the one or more alternatives.

17. The method of claim 1, wherein the first purchase transaction and the second purchase transaction are associated with different money transmitters.

18. The method of claim 1, further comprising:

generating a first invoice associated with the first vendor; and generating at least a second invoice for at least the second vendor.

19. The method of claim 18, further comprising delivering the first invoice and at least the second invoice as a combined list via the user interface.

* * * * *